United States Patent
Musat et al.

(10) Patent No.: US 8,170,966 B1
(45) Date of Patent: May 1, 2012

(54) DYNAMIC STREAMING MESSAGE CLUSTERING FOR RAPID SPAM-WAVE DETECTION

(75) Inventors: Claudiu C. Musat, Bucharest (RO); Ionut Grigorescu, Ploiesti (RO); Alexandru Trifan, Buzau (RO); Carmen A Mitrica, Slatina (RO)

(73) Assignee: Bitdefender IPR Management Ltd., Nicosia (CY)

( * ) Notice: Subject to any disclaimer, the term of this patent is extended or adjusted under 35 U.S.C. 154(b) by 704 days.

(21) Appl. No.: 12/264,387

(22) Filed: Nov. 4, 2008

(51) Int. Cl.
*G06E 1/00* (2006.01)
*G06E 3/00* (2006.01)
*G06F 15/18* (2006.01)
*G06G 7/00* (2006.01)

(52) U.S. Cl. ............... 706/16; 706/20; 706/14; 706/18
(58) Field of Classification Search .................. None
See application file for complete search history.

(56) References Cited

U.S. PATENT DOCUMENTS

| | | | |
|---|---|---|---|
| 5,361,353 A | 11/1994 | Carr et al. | |
| 6,023,723 A | 2/2000 | McCormick et al. | |
| 6,052,709 A | 4/2000 | Paul | |
| 6,161,130 A | 12/2000 | Horvitz et al. | |
| 6,421,709 B1 | 7/2002 | McCormick et al. | |
| 6,533,822 B2 | 3/2003 | Kupiec | |
| 6,542,635 B1 | 4/2003 | Hu et al. | |
| 6,564,202 B1 | 5/2003 | Schuetze et al. | |
| 6,598,054 B2 | 7/2003 | Schuetze et al. | |
| 6,687,740 B1 | 2/2004 | Gough et al. | |
| 6,701,305 B1 | 3/2004 | Holt et al. | |
| 6,708,205 B2 | 3/2004 | Sheldon et al. | |
| 6,718,368 B1 | 4/2004 | Ayyadurai | |
| 6,772,196 B1 | 8/2004 | Kirsch et al. | |
| 6,941,321 B2 | 9/2005 | Schuetze et al. | |
| 6,963,869 B2 | 11/2005 | Burrows | |
| 7,007,069 B2 | 2/2006 | Newman et al. | |
| 7,076,527 B2 | 7/2006 | Bellegarda et al. | |
| 7,089,241 B1 | 8/2006 | Alspector et al. | |
| 7,099,819 B2 | 8/2006 | Sakai et al. | |
| 7,178,099 B2 | 2/2007 | Meyer et al. | |
| 7,257,564 B2 | 8/2007 | Loughmiller et al. | |
| 7,519,565 B2 | 4/2009 | Prakash et al. | |
| 7,555,523 B1 | 6/2009 | Hartmann | |
| 7,577,656 B2 | 8/2009 | Kawai et al. | |
| 7,725,544 B2 * | 5/2010 | Alspector et al. ............ | 709/206 |
| 7,751,620 B1 | 7/2010 | Cosoi | |
| 7,945,627 B1 | 5/2011 | Musat | |

(Continued)

OTHER PUBLICATIONS

Tom, P. , Clustering botnets, MIT Spam Conference 2008, Boston MA.

(Continued)

*Primary Examiner* — Kakali Chaki
*Assistant Examiner* — Daniel Pellett
(74) *Attorney, Agent, or Firm* — Law Office of Andrei D Popovivi, PC

(57) ABSTRACT

In some embodiments, a streaming message classification method dynamically allocates a stream of messages to a variable number of clusters (e.g. message categories), each containing messages which share a set of similar features. Incoming messages are compared to a collection of known spam clusters. New spam types are identified, and new clusters are created automatically and dynamically in order to accommodate the new spam types. Message clustering is performed in a hyperspace of message feature vectors using a modified k-means algorithm. Triangle inequality distance comparisons may be used to accelerate hyperspace distance calculations.

26 Claims, 13 Drawing Sheets

U.S. PATENT DOCUMENTS

| | | | |
|---|---|---|---|
| 8,010,614 | B1 | 8/2011 | Musat et al. |
| 8,065,379 | B1 | 11/2011 | Musat |
| 2002/0078349 | A1 | 6/2002 | Marso et al. |
| 2003/0041126 | A1 | 2/2003 | Buford et al. |
| 2003/0135555 | A1 | 7/2003 | Birrel et al. |
| 2004/0167968 | A1 | 8/2004 | Wilson et al. |
| 2004/0199594 | A1 | 10/2004 | Radatti et al. |
| 2004/0221012 | A1 | 11/2004 | Heumesser |
| 2005/0144241 | A1 | 6/2005 | Stata et al. |
| 2005/0193073 | A1 | 9/2005 | Mehr et al. |
| 2005/0198166 | A1 | 9/2005 | Kawaji |
| 2005/0262209 | A1 | 11/2005 | Yu |
| 2006/0010217 | A1 | 1/2006 | Sood |
| 2006/0031319 | A1 | 2/2006 | Nelson et al. |
| 2006/0089924 | A1 * | 4/2006 | Raskutti et al. .............. 707/1 |
| 2006/0095521 | A1 | 5/2006 | Patinkin |
| 2006/0123083 | A1 | 6/2006 | Goutte et al. |
| 2007/0061402 | A1 | 3/2007 | Mehr et al. |
| 2007/0130262 | A1 | 6/2007 | Williams et al. |
| 2007/0255792 | A1 | 11/2007 | Gronberg |
| 2008/0168144 | A1 | 7/2008 | Lee |
| 2008/0215692 | A1 | 9/2008 | Bosarge et al. |
| 2009/0164598 | A1 | 6/2009 | Nelson et al. |

OTHER PUBLICATIONS

Cosoi, A. C., Assigning relevances to individual features for large patterns in ARTMAP networks, DAAAM International Symposium "Intelligent Manufacturing and Automation", 2007, Zadar, Croatia.

Kim, Dongmoon et al., A music recommendation system with a dynamic k-means clustering algorithm, Proceedings of 6th International Conference on Machine Learning and Applications, 2007, pp. 399-403.

Cosoi, A.C., An antispam filter based on adaptive neural networks, MIT Spam Conference 2006, Boston, MA.

Cao, F. et al., Density-based clustering over an evolving data stream with noise, Proc. 6th SIAM Conference on Data Mining 2006, Bethesda MD.

Musat C., Layout-based spam filtering, Proceedings of the World Academy of Science, Engineering and Technology vol. 12, pp. 161-164, 2006.

Park, H et al., A k-means-like algorithm for k-medoids clustering and its performance, Proceedings of ICCIE 2006, Taipei, Taiwan.

Sasaki, M., & Shinnou, H., Spam detection using text clustering, Proceedings of the International Conference on Cyberworlds, 2005, pp. 316-319, IEEE Computer Society, Washington DC.

Davidson, I. et al., Clustering with constraints: feasibility issues and the k-means algorithm, IEEE ICDM 2005.

Shah, R. et al., Resource-aware very fast k-means for ubiquitous data stream mining, working paper, 2004.

Aggarwal, C. C. et al., A framework for clustering evolving data streams, Proceedings of VLDB 2003, Berlin, Germany.

Elkan, C., Using triangle inequalities to accelerate k-means, Proceedings of ICML 2003, Washington, D.C.

Wagstaff, K., et al., Constrained k-means clustering with background knowledge, Proceedings of ICML, 2001, pp. 577-584, Morgan-Kaufmann.

Domingos, P., A general method for scaling up machine learning algorithms and its applications to clustering, Proceedings of ICML, 2001, pp. 106-113, Morgan-Kaufmann.

Ester, M., A density-based algorithm for discovering clusters in large spatial databases with noise, Proceedings of ICKDDM, 1996.

Chinrungrueng, C. & Sequin, C. H., Optimal adaptive k-means algorithm with dynamic adjustment of learning rate, IEEE Transactions on Neural Networks, vol. 6, No. 1, pp. 157-169, 1995.

A tutorial on Clustering Algorithms, http://home.dei.polimi.it/matteucc/Clustering/tutorial_html/kmeans.html, downloaded on Nov. 5, 2008.

A tutorial on Clustering Algorithms, http://web.archive.org/web/*/http://home.dei.polimi.it/matteucc/Clustering/tutorial_html/kmeans.html, downloaded on Nov. 5, 2008; archive.org indicates document date of Aug. 9, 2007.

Musat, C.N. Claudiu, Layout-based electronic communication filtering systems and methods, U.S. Appl. No. 11/536,370, filed Sep. 28, 2006.

Cosoi, U.S. Appl. No. 11/497,662, filed Aug. 1, 2006, "Adaptive Spam Filtering Systems and Methods".

Cosoi, U.S. Appl. No. 11/867,547, filed Oct. 4, 2007, "Systems and Methods for Dynamically Integrating Heterogeneous Anti-Spam Filters".

Cosoi, U.S. Appl. No. 11/967,563, filed Dec. 31, 2007, "Systems and Methods for Electronic Fraud Prevention".

Cosoi, U.S. Appl. No. 12/130,630, filed May 30, 2008, filed May 30, 2008, "Spam Filtering using Feature Relevance Assignment in Neural Networks".

Dulucq, S. et al., "Analysis of Tree Edit Distance Algorithms," Combinatorial Pattern Matching: 14th Annual Symposium, CPM 2003, Morelia, Michoacán, Mexico, Jun. 25-27, 2003, Proceedings; Lecture Notes in Computer Science, Springer Berlin/Heidelberg, vol. 2676/2003, p. 83-95.

Mao, S. et al., "Logical Entity Recognition in Multi-Style Document Page Images," Proceedings of the 18th International Conference on Pattern Recognition (ICPR'06)—vol. 01, Aug. 20-24, 2006, IEEE Computer Society, Washington, DC, USA, p. 876-879.

* cited by examiner

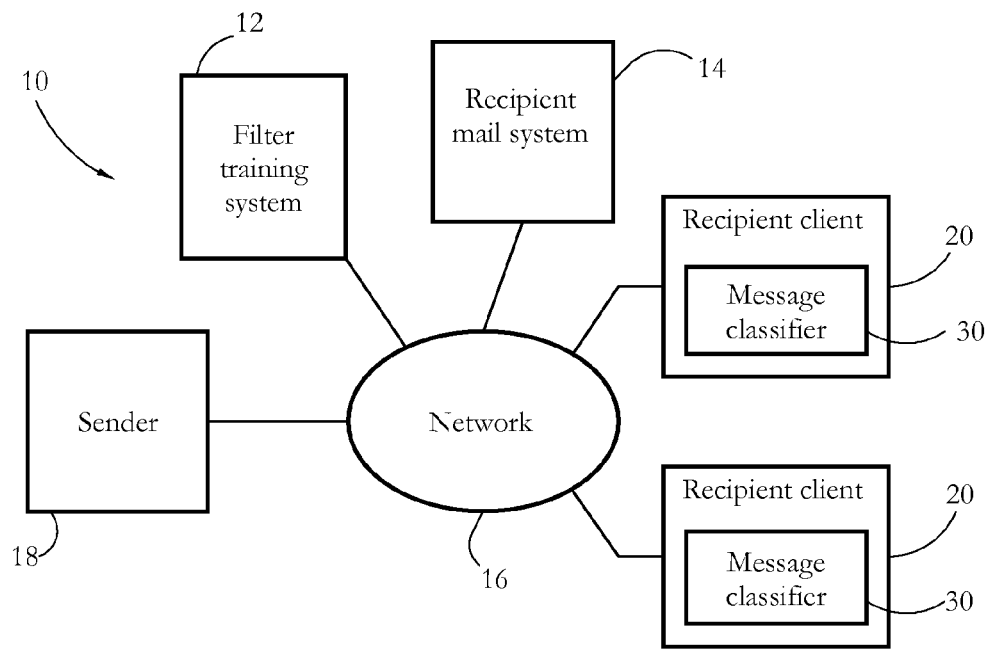
FIG. 1-A
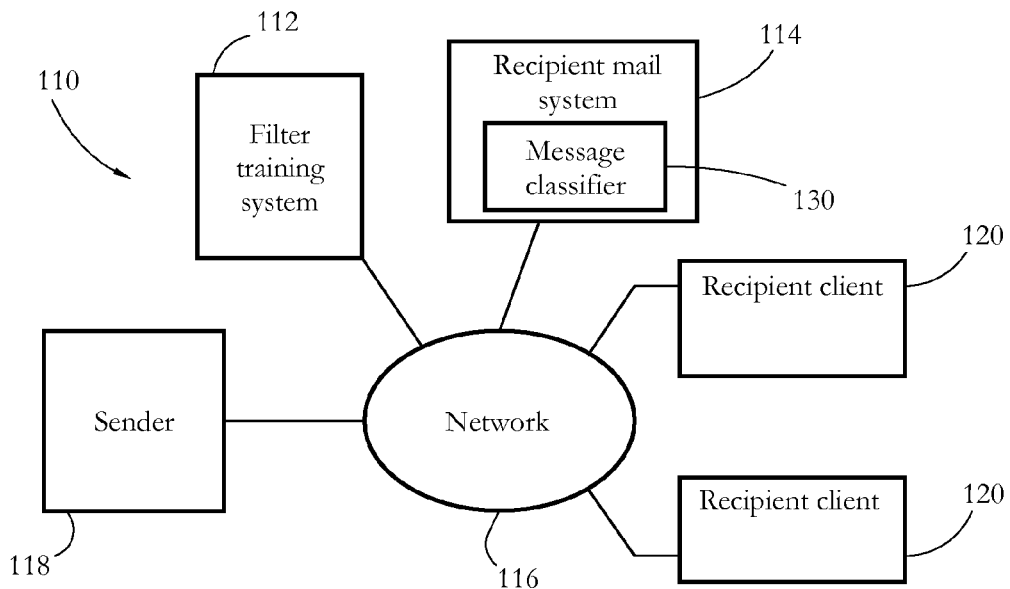
FIG. 1-B

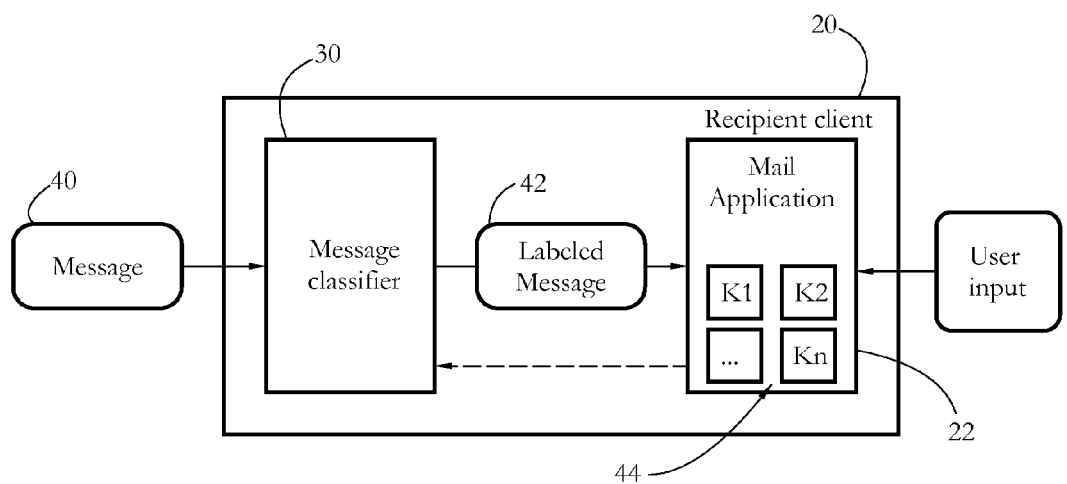
FIG. 2-A
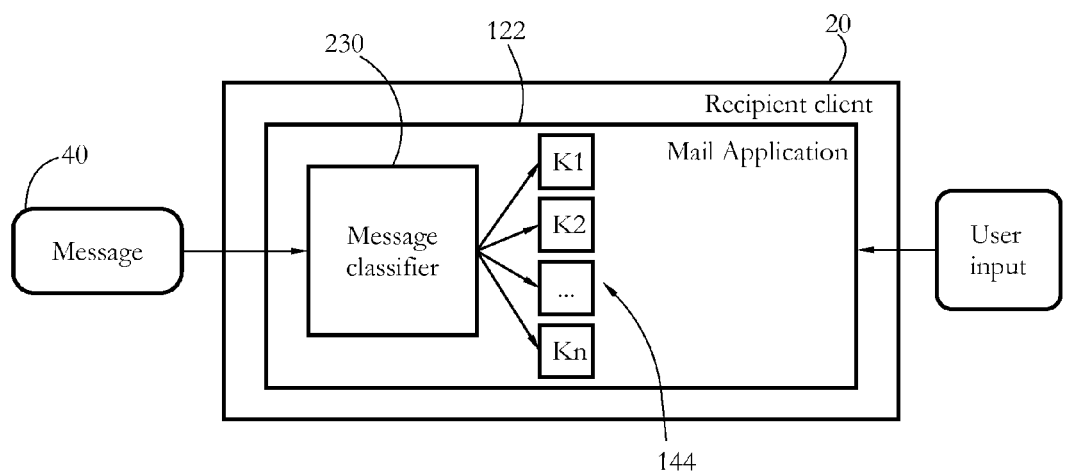
FIG. 2-B

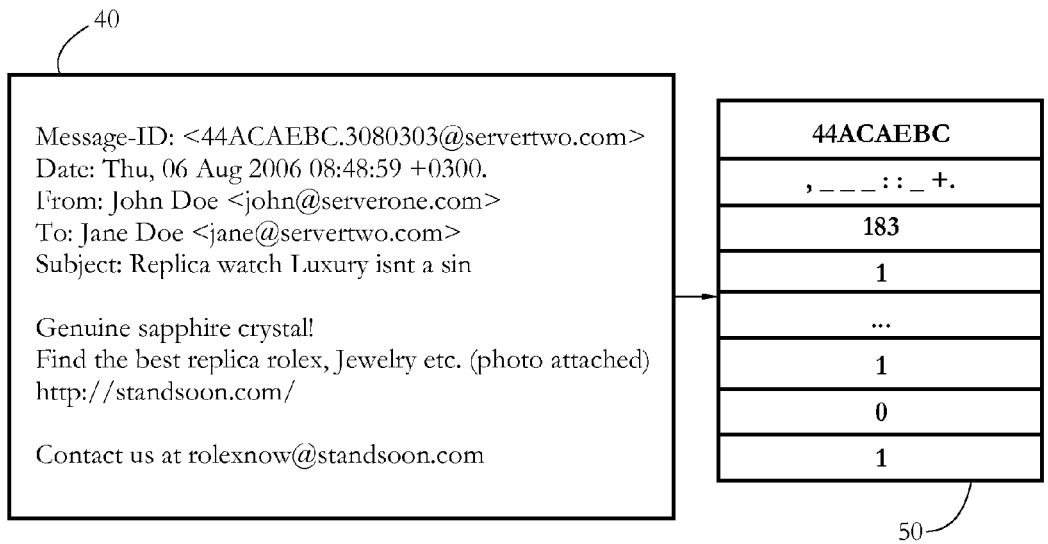
FIG. 5-A
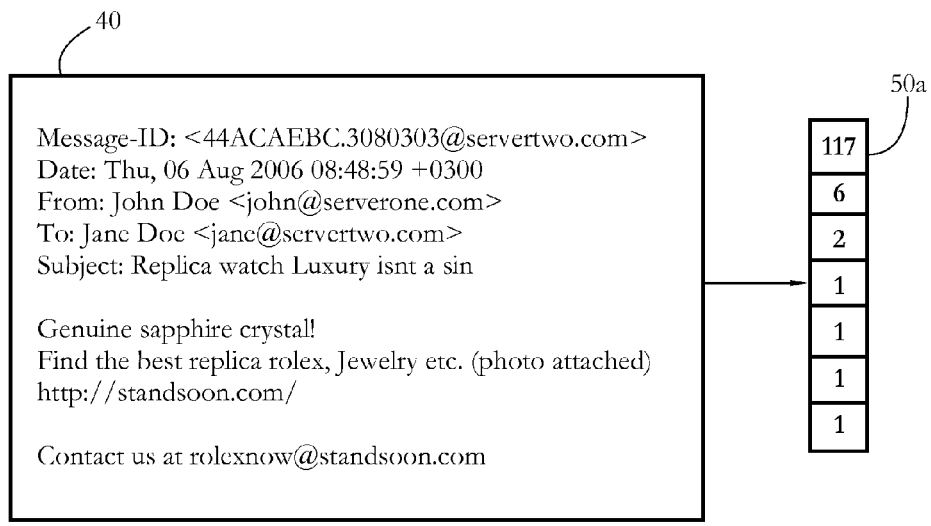
FIG. 5-B

141 {
Message-ID: <44ACAEBC.3080303@servertwo.com>
Date: Thu, 06 Aug 2006 08:48:59 +0300
From: John Doe<john@serverone.com>
To: Jane Doe <jane@servertwo.com>
Subject: Replica watch Luxury isnt a sin
}

40

142 {
Content-Type: multipart/mixed;
 boundary="------------070308050501060903030605"
--------------030204060106020509020605

143a {
Content-Type: text/plain; charset=ISO-8859-1;
format=flowed; Content-Transfer-Encoding: 7bit Genuine sapphire crystal!
Find the best replica rolex, Jewelry etc. (photo attached)
http://standsoon.com/
Contact us at rolexnow@standsoon.com
}

143b {
--------------070308050501060903030605
Content-Type: text/html; charset=ISO-8859-1
Content-Transfer-Encoding: 7bit
<!DOCTYPE html PUBLIC "-//W3C//DTD HTML 4.01
Transitional//EN">
<html>
<head></head>
<body>Genuine sapphire crystal!<br>
 Find the best replica rolex, Jewelry etc. (photo attached)<br>
<a href= "http://standsoon.com">http://standsoon.com</a>
<br><p>
Contact us at <a href="mailto: rolexnow@standsoon.com">
rolexnow@standsoon.com</a><br>
<img src="cid:part1.090205@serverone.com">
</body>
</html>
}

143c {
--------------070308050501060903030605
Content-Type: image/jpeg;
Content-Transfer-Encoding: base64
Content-ID: <part1.090205@serverone.com>
/9j/4AAQSkZJRgABAgEASABIAAD/7RIKUGhvdG9zaG9wI
DMuMAA4QklNA+kAAAAAHgAAwAAAE
--------------070308050501060903030605--
}
}

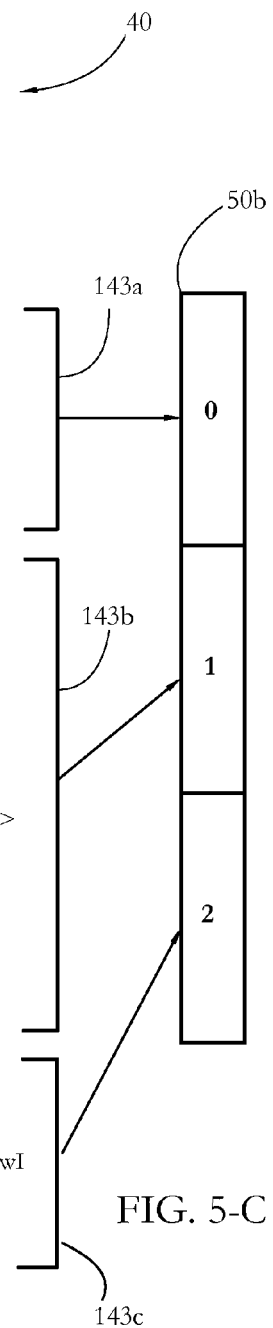

FIG. 5-C

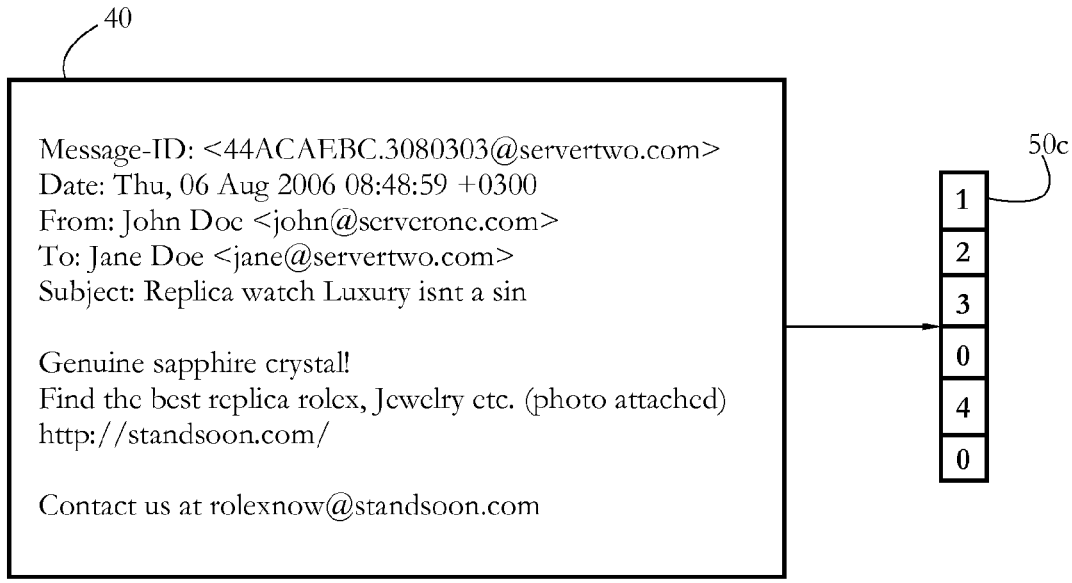
FIG. 5-D
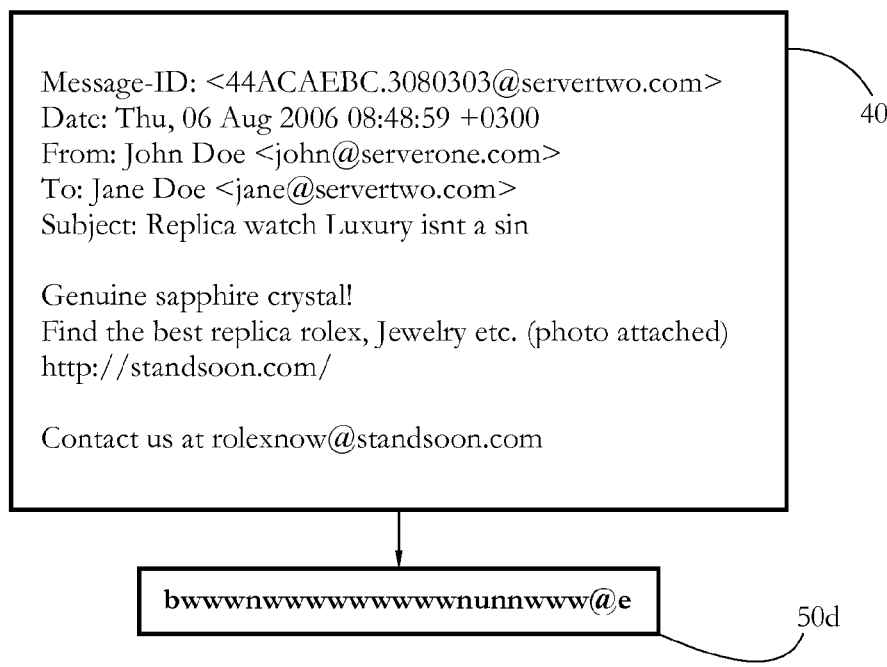
FIG. 5-E

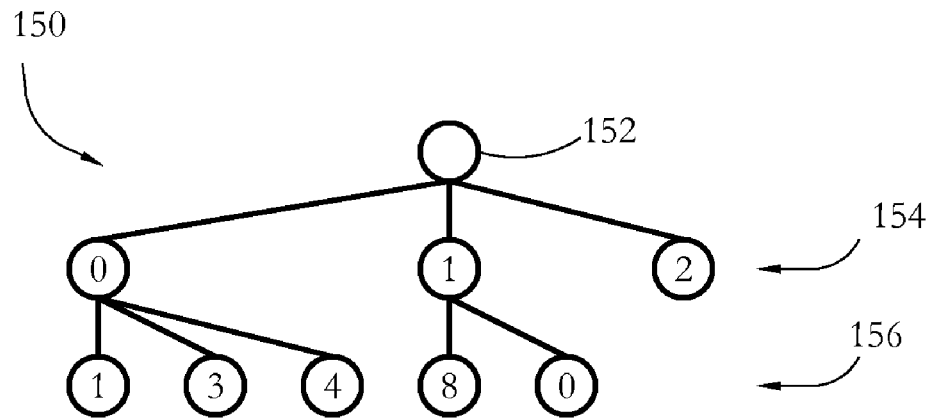
FIG. 5-F
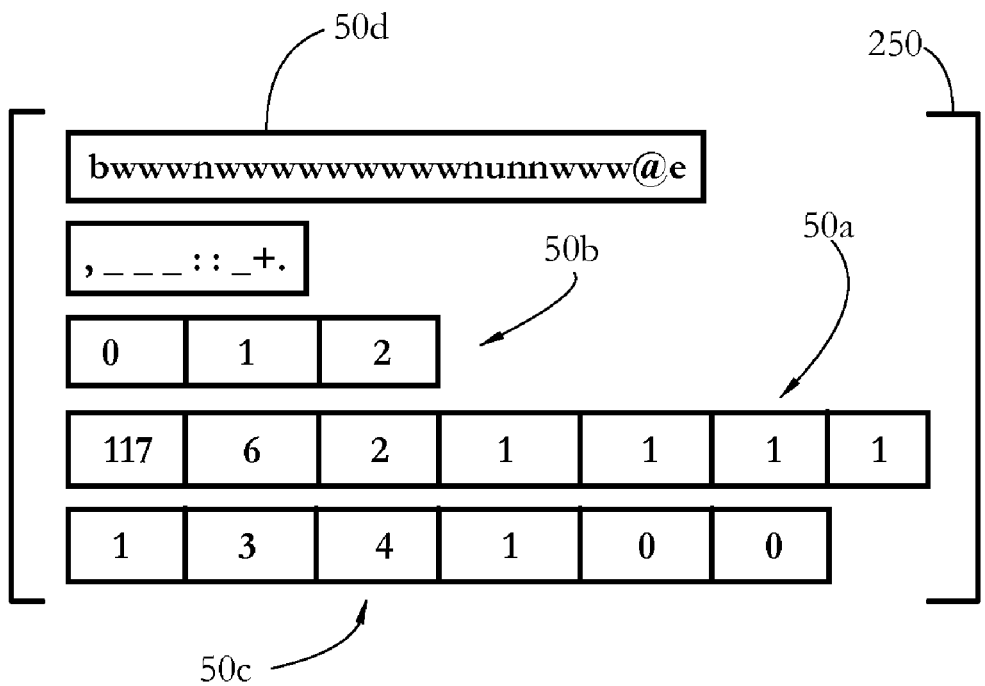
FIG. 5-G

DYNAMIC STREAMING MESSAGE CLUSTERING FOR RAPID SPAM-WAVE DETECTION

BACKGROUND

The invention relates to systems and methods for classifying electronic communications, and in particular to systems and methods for filtering unsolicited commercial electronic mail (spam).

Unsolicited electronic communications, also known as spam or junk mail, form a significant portion of all communication traffic worldwide, affecting both computer and telephone messaging services. Spam takes up valuable hardware resources, affects office productivity, and is considered annoying and intrusive by many recipients of such messages.

Software running on an email user's or email service provider's system may be used to classify email messages as spam or non-spam, and even to discriminate between various kinds of spam messages (e.g., product offers, adult content, email scams). Spam messages can then be directed to special folders or deleted. Several approaches have been proposed for identifying spam messages, including matching the message's originating address to lists of known offending or trusted addresses (techniques termed black- and white-listing, respectively), searching for certain words or word patterns (e.g. refinancing, Viagra®, stock), and analyzing message headers. Feature extraction/matching methods are often used in conjunction with automated data classification methods (e.g., Bayesian filtering, neural networks).

Spam often arrives in a rapid succession of groups of similar messages also known as spam waves. The form and content of spam may change substantially from one spam wave to another. Since the efficiency of anti-spam methods generally decreases in time, successful detection may benefit from methods and systems capable of quickly recognizing and reacting to new spam waves.

SUMMARY

According to one aspect, a method comprises: receiving a message stream; determining whether to add a first cluster to a set of spam clusters by determining whether a first message of the message stream belongs to at least one of the set of spam clusters, wherein a second cluster of the set of spam clusters has a first centroid and wherein determining whether the first message belongs to the second cluster comprises determining a first distance between a first feature vector representing the first message and a second feature vector representing the first centroid; and when the first message does not belong to any of the set of spam clusters, adding the first cluster to the set of spam clusters, wherein the first cluster includes the first message.

According to another aspect, a system comprises: a novelty filter configured to determine whether to add a first cluster to a set of spam clusters by determining whether a first message of a message stream belongs to at least one of the set of spam clusters, wherein a second cluster of the set of spam clusters has a first centroid, and wherein determining whether the first message belongs to the second cluster comprises determining a first distance between a first feature vector representing the first message and a second feature vector representing the first centroid; and a training engine connected to the novelty filter and configured to add the first cluster to the set of spam clusters when the first message does not belong to any of the set of spam clusters, wherein the first cluster includes the first message.

According to another aspect, a system comprises: means for determining whether a first message of a message stream belongs to at least one of a set of spam clusters, wherein a first cluster of the set of spam clusters has a centroid, and wherein determining whether the first message belongs to the first cluster comprises evaluating a first distance between a first feature vector representing the message and a second feature vector representing the centroid; and means for adding a second cluster to the set of spam clusters according to the first message, when the first message does not belong to any of the set of spam clusters.

BRIEF DESCRIPTION OF THE DRAWINGS

The foregoing aspects and advantages of the present invention will become better understood upon reading the following detailed description and upon reference to the drawings where:

FIGS. 1-A shows an exemplary electronic communication system including multiple recipient client computers each having a message classifier (e.g. application) according to some embodiments of the present invention.

FIG. 1-B shows an exemplary electronic communication system including a recipient mail system having a message classifier capable of classifying messages sent to multiple clients, according to some embodiments of the present invention.

FIG. 2-A illustrates an exemplary message classifier distinct from an electronic mail application, according to some embodiments of the present invention.

FIG. 2-B illustrates an exemplary message classifier forming part of an electronic mail application, according to some embodiments of the present invention.

FIG. 5-A shows an exemplary message and corresponding message feature vector according to some embodiments of the present invention.

FIG. 5-B shows an exemplary set of layout feature counts forming part of the message feature vector of FIG. 5-A.

FIG. 5-C shows a raw/source view of a message and an exemplary set of formatting part indices forming part of the message feature vector of FIG. 5-A, according to some embodiments of the present invention.

FIG. 5-D shows an exemplary set of line-layout indices forming part of the message feature vector of FIG. 5-A, according to some embodiments of the present invention.

FIG. 5-E shows an exemplary message summary string according to some embodiments of the present invention.

FIG. 5-F illustrates a tree representation of an exemplary message feature vector according to some embodiments of the present invention.

FIG. 5-G illustrates a heterogeneous data structure representation of a message feature vector according to some embodiments of the present invention.

DETAILED DESCRIPTION OF PREFERRED EMBODIMENTS

Figure 3:
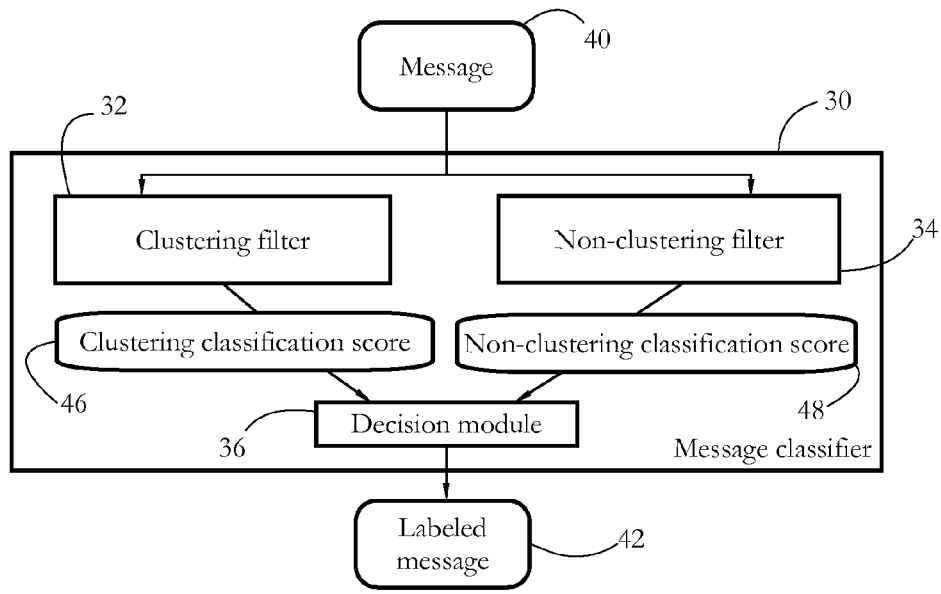
FIG. 3 shows a diagram of a message classifier according to some embodiments of the present invention.

In the following description, it is understood that all recited connections between structures can be direct operative connections or indirect operative connections through intermediary structures. A set of elements includes one or more elements. Any recitation of an element is understood to refer to at least one element. Unless otherwise required, any described method steps need not be necessarily performed in a particular illustrated order. A first element (e.g. data) derived from a second element encompasses a first element equal to the second element, as well as a first element generated by processing the second element and optionally other data. Unless otherwise specified, the term "program" encompasses both stand-alone programs and software routines that form part of larger programs. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a cluster centroid is a central point of a cluster. The coordinates of such a central point may be, without limitation, averages or other combinations (with or without weights) of cluster member coordinates, median or other representative cluster point coordinates, or combinations of averaged and representative point coordinates. For example, an exemplary centroid may include a set of cluster-averaged coordinates along a first set of axes, and a set of median/medoid cluster coordinates along a second set of axes. Unless otherwise specified, the term hyperspace encompasses any space having at least one axis. Unless otherwise specified, a list encompasses any ordered concatenation/sequence of indicators; a list may be represented in source code as an array data structure (e.g. an array of characters) or a string data structure, among others. Unless otherwise specified, the term spam is not limited to email spam, but encompasses non-legitimate or unsolicited commercial electronic communications such as email, instant messages, and phone text and multimedia messages, among others. An upper bound associated to a message-cluster pair is a number greater than or equal to the distance between a feature vector representing the message and a centroid of the cluster. A lower bound associated with a message-cluster pair is a number less than or equal to the distance between a feature vector representing the message and a centroid of the cluster. Metaword substructures of a message are substructures of a higher level of abstraction than characters or words; examples of metaword substructures include message lines, addresses, hyperlinks, and differently-formatted message parts (e.g. MIME parts). Computer readable media encompass storage media such as magnetic, optic, and semiconductor media (e.g. hard drives, optical disks, flash memory, DRAM), as well as communications links such as conductive cables and fiber optic links.

The following description illustrates embodiments of the invention by way of example and not necessarily by way of limitation.

FIG. 1-A shows an electronic communication and classification system 10 according to some embodiments of the present invention. System 10 may be an electronic mail (email), instant messaging (IM), mobile telephone, or other electronic communication system. For clarity, the following discussion will focus in particular on an electronic mail system. System 10 includes a mail sender system 18, a recipient mail system 14, a filter training system 12, and a plurality of recipient client systems 20. Sender system 18 may include a mail server and/or one or more sender client computer systems. Recipient mail system 14 may include a recipient mail server. A network 16 connects sender system 18, recipient mail system 14, filter training system 12, and recipient client systems 20. Network 16 may be a wide-area network such as the Internet. Parts of network 16, for example a part of network 16 interconnecting recipient client systems 20, may also include a local area network (LAN). Each recipient client system 20 includes a message classifier 30 which may be a computer program, and which is used to classify electronic communications as described in detail below.

An email message sent by sender system 18 to one or more email addresses is received at mail system 14, and then sent via network 16 or made available otherwise (e.g. through a web interface) to recipient client systems 20. The message is then classified into one of a plurality of classes by classifiers 30.

FIG. 1-B shows an electronic communication and classification system 110 according to some embodiments of the present invention. System 110 differs from the system 10 shown in FIG. 1-A in that a common message classifier 130 is provided as part of a recipient mail system 114. For example, classifier 130 may be a computer program residing on a subsystem of recipient system 114, such as a mail server application. A plurality of client systems 120 receive pre-classified messages from system 114, and do not include individual mail classification applications.

FIG. 2-A shows an exemplary recipient client 20 including message classifier 30 according to some embodiments of the present invention. Client 20 comprises an email application 22 separate from message classifier 30. In some embodiments, classifier 30 may be a stand-alone application, or may be an anti-spam module of a security suite having antivirus, firewall, and other modules. Message classifier 30 receives an incoming email message 40, and transfers a labeled (classified) message 42 to email application 22. Labeled message 42 may include a class label, which may be placed in a header field of message 42. In some embodiments, message classifier 30 may transfer to email application 22 a class label and an indicator of an association of the class label to message 40.

Classifier 30 assigns incoming message 40 to one of a plurality of classes 44 (labeled $K_1$-$K_n$ in FIG. 2-A). In some embodiments, classes 44 include one or more classes of unsolicited commercial email (spam), and one or more classes of non-spam (legitimate or unknown) email. In a simple embodiment, classes 44 may include spam and non-spam. In some embodiments, spam classes may include product offers and phishing, while classes of legitimate email may include personal and work, among others. Some embodiments of email application 22 associate classes 44 with individual email folders. A user may interact with email application 22 and/or classification engine 30 to manually alter the classification of any message, for example by moving the message from one folder to another. In some embodiments, email application 22 may feed the details of the user interaction back to message classifier 30, as symbolized by the dashed line in FIG. 2-A.

FIG. 2-B shows an exemplary recipient client computer system 120 including a message classifier 230 integrated within an email application 122. Message 40 is directed to one of a plurality of classes (folders) 144 by message classifier 230 or by other routines of email application 122. Classes 144 may include one or more spam classes and one or more non-spam classes. A user may interact with email application 122 to manually alter the classification of given messages.

FIG. 3 shows a diagram of message classifier 30 according to some embodiments of the present invention. Classifier 30 includes a clustering filter 32, a non-clustering filter 34, and a decision module 36 connected to filters 32 and 34. Clustering filter 32 analyzes incoming message 40 using data clustering methods described in more detail below. Non-clustering filter 34 performs spam detection on message 40 using methods other than data clustering. Examples of non-clustering filters include signature (e.g. character pattern) matching filters and image analysis filters, among others. Filters 32 and 34 output a clustering classification score 46 and a non-clustering classification score 48, respectively. In some embodiments, classification scores 46, 48 indicate the class assignment of message 40, according to each filter's specific analysis method. Scores 46, 48 may be binary (e.g., 1/0, YES/NO), or real numbers (e.g. numbers between 0 and 1 showing the probability that message 40 is spam), or lists of n numbers giving e.g. the probability that message 40 belongs to each of message classes $K_1$-$K_n$ in FIGS. 2-A-B, or combinations of the above. Decision module 36 inputs classification scores 46, 48 from filters 32 and 34 and computes a combined classification score and/or a class assignment for incoming message 40. In some embodiments, decision module 36 produces a class label and attaches it to message 40 to generate labeled message 42.

In some embodiments, filters 32, 34 may operate in sequence or in a parallel-sequential configuration, instead of the parallel configuration shown in FIG. 3. In an exemplary sequential configuration, message 40 may pass through non-clustering filter 34 first and then through clustering filter 32. The classification score/class assignment may change at each step of the sequence according to the output of the respective filter.

Figure 4:
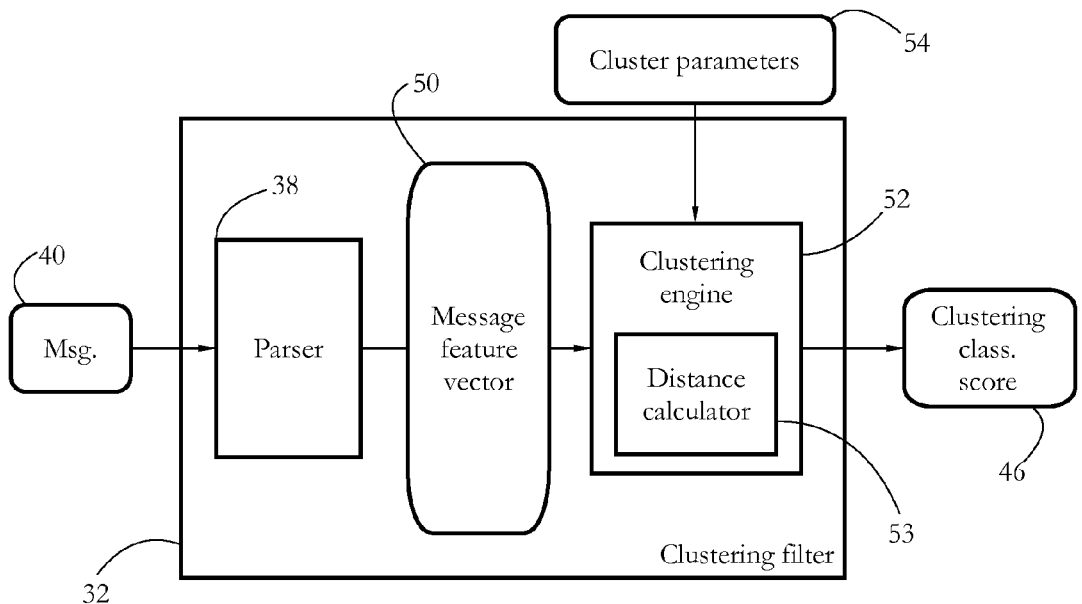
FIG. 4 illustrates the structure of an exemplary clustering filter forming part of the message classifier of FIG. 3, according to some embodiments of the present invention.

FIG. 4 shows an exemplary structure of clustering filter 32 according to some embodiments of the present invention. Filter 32 comprises a parser 38 and a clustering engine 52 attached to parser 38. In some embodiments, clustering engine 52 may include a distance calculator 53. Parser 38 analyzes incoming message 40 to generate a message feature vector 50. Clustering engine 52 computes clustering classification score 46 corresponding to incoming message 40 by processing message feature vector 50 according to a set of cluster parameters 54 generated from a training process described in detail below. Generating score 46 effectively assigns message 40 to a message class (e.g. $K_1$-$K_n$ in FIGS. 2-A-B).

FIG. 5-A shows an exemplary message 40 and a message feature vector 50 corresponding to message 40 according to some embodiments of the present invention. Feature vector 50 comprises an ordered list of indices, each quantifying a property of message 40. Various spam-identifying heuristics may be used to construct feature vector 50. In some embodiments, some elements of vector 50 may be binary numbers (1/0), showing whether message 40 has a corresponding feature or not (e.g. whether message 40 has an attachment, whether message 40 contains certain keywords, or whether the sender is blacklisted). In some embodiments, elements of feature vector 50 may be integer or real numbers or character strings. For example, in FIG. 5-A, a first element is a fragment of the message ID (44ACAEBC), a second element is a date format string encoding the format and punctuation of the message arrival date (wherein "_" denotes a space), while a third element is a message size (183 kB in this case). A fourth element (1 in this case) may show e.g. that the message has an attachment.

In some embodiments, message feature vector 50 may include a set of layout feature indices, quantifying the graphical layout of message 40 by specifying the relative positions of a set of metaword substructures of message 40. In some embodiments, layout feature indices may include layout feature counts, formatting part indices, message summary strings, and line-layout indices, among others.

FIG. 5-B shows an exemplary set of layout feature counts 50a corresponding to message 40, including a total number of characters (117), total number of new lines (6), blank lines (2), website links (1), email addresses (1), images (1), or attached files (1). In some embodiments, the number of layout feature counts 50a is message-independent.

FIG. 5-C shows a raw/source view of email message 40 and a set of corresponding formatting-part indices 50b. Message 40 includes a header 141 and a message body 142. Header 141 may include fields denoting the message's path, sender, recipient, and date, among others. Message body 142 contains multiple differently-formatted parts (e.g. MIME parts): a plain-text part 143a, an HTML part 143b, and an image part 143c. Distinct MIME parts may be separated by formatting-part boundary markers. In some embodiments, parser 38 (FIG. 4) identifies various formatting parts 143a-c within message 40, and arranges indices representing parts 143a-c in an ordered list. In some embodiments, every formatting part receives an index/label 50b (e.g. 0 for plain text, 1 for HTML, 2 for image/jpeg, etc.). In some embodiments, formatting part indices may be stored as a character string (i.e. "012") instead of a integer-valued vector as shown in FIG. 5-C. In some embodiments, the number of formatting part indices 50b is message-dependent.

In some embodiments, message feature vector 50 includes a set of line-layout indices. FIG. 5-D shows an exemplary set of line-layout indices 50c corresponding to message 40. In some embodiments, indices 50c include an ordered list of values representing the line structure of the message. In the example of FIG. 5-D, the list of line-layout indices 50c has the value 123040, wherein the number 1 signifies a short line ("Genuine sapphire crystal!"), the number 2 signifies a long line ("Find the best replica rolex, Jewelry etc. (photo attached)"), the number 3 signifies a line containing a hyperlink ("http://standsoon.com/"), the number 0 denotes a blank line, and the number 4 denotes a line containing an email address ("rolexnow@standsoon.com"). Depending on the communication protocol, the body of the text part of the message may not contain explicit line breaks, in which case such line breaks may be generated by a subsystem of parser 38. Line breaks may be generated by creating individual lines having a fixed number of characters (e.g. 72 or 80) prior to analyzing the line-layout of the message. In some embodiments, parser 38 may use additional formatting information stored in an HTML-part of the message, if available, to decide upon the line-layout of the message. In some embodiments, line-layout indices 50*c* may be stored as a character string (i.e. "123040"), instead of a vector of integers.

In some embodiments, feature vector 50 includes a message summary string. FIG. 5-E shows an exemplary message summary string 50*d* corresponding to message 40. String 50*d* may be a list of characters encoding a sequence of words and/or metaword substructures of message 40 (e.g., links, text lines, email addresses). In the example of FIG. 5-E, string 50*d* has the value bwwwnwwwwwwwwwnunnwww@e, wherein b may denote the beginning of the message part which is being analyzed (e.g. the text part), followed by the sequence wwwn, denoting three words and a line break ("Genuine sapphire crystal!"). Next, wwwwwwwwwn denotes a sequence of 9 words followed by a line break ("Find the best replica rolex, Jewelry etc. (photo attached)"), while unn represents a URL link (http://standsoon.com) followed by an empty line. String 50*d* ends with www@e, denoting three words ("Contact us at") followed by an email address (rolexnow@standsoon.com) and character e, which may represent the end of the text part of message 40. Similar message summary strings may be computed for HTML parts. For example, the <BR> and <DIV> tags of HTML may be coded as new lines (n), while the <P> tag may be denoted by two new line characters (nn). A URL character (u) may represent the HTML anchor tag <A>. In some embodiments, feature vector 50 may include message summary strings corresponding to each part (e.g. MIME part) of message 40 and/or a concatenation of summary strings corresponding to various message parts.

In some embodiments, one or more components of message feature vector 50 may be organized as a tree structure. FIG. 5-F shows such a tree structure 150 including a root node 152, a set of first level nodes 154, and a set of second level nodes 156. In some embodiments, root node 152 represents message 40, while first level nodes 154 may represent formatting (e.g. MIME) parts of the message. Second- and higher-level nodes may represent line-layout indices and/or heuristics of other metaword substructures. Each node in the tree structures includes an identifier of its corresponding structure. For example, for the message shown in FIG. 5-C, first-level nodes 154 may hold the values 0, 1, 2, respectively, corresponding to plain text, html, and image MIME parts. In some embodiments, tree structure 150 may include fewer or more levels than shown in FIG. 5-F, and fewer or more nodes at each level.

In some embodiments, message feature vector 50 may include a heterogeneous data structure. FIG. 5-G shows an exemplary data structure 250 comprising five data fields. The first and second data fields comprise message summary string 50*d* (FIG. 5-E), and date format string (FIG. 5-A). The third, fourth, and fifth fields comprise formatting part indices 50*b* (FIG. 5-C), layout feature counts 50*a* (FIG. 5-B), and line-layout indices 50*c* (FIG. 5-D), respectively. In some embodiments, the number and ordering of data fields, as well as the number of elements in each data field, may vary from the ones described above. In some embodiments, the number of elements in each data field may be message-dependent.

To produce message feature vector 50, parser 38 may break up message 40 into constituent parts (e.g. header, text body, images, MIME parts, etc.), may extract information from the message header (e.g., message ID, sender, date and date format, and subject fields of an email message), may remove or insert formatting information (e.g. HTML tags, line breaks), and apply a set of heuristic functions on various message elements. Some embodiments of message parser 38 may interact with mail application 22, 122 (FIG. 2-A-B) and/or other software applications residing on recipient client system 20 and/or other parts of system 10. For example, parser 38 may use some of the browser rendering routines residing on system 20 to interpret the HTML layout of message 40.

In some embodiments, clustering engine 52 aggregates incoming messages 40 into message clusters (e.g. categories). Each cluster may contain messages characterized by a subset of message features having similar values. Exemplary embodiments of a message cluster may include a subset of spam messages, such as a collection of messages belonging to an individual spam wave, or a subset of non-spam messages, or a collection including both spam and non-spam messages. A message cluster may correspond to a message class (FIG. 2-A-B). In some embodiments, several message clusters may correspond to the same message class. For example, in a simple embodiment with two message classes (spam and non-spam), there may be several clusters (e.g. phishing, product offers, adult material), all belonging to the spam class.

Exemplary message clustering criteria may include the presence (or absence) of Bayes poison within a message, the presence of common keywords (e.g. "pharmacy"), or similarities in the types and/or the order of fields within the message header, or similarities in message layout.

In some embodiments, clustering engine 52 aggregates messages 40 according to their location in a feature hyperspace constructed using message feature vectors 50. In some embodiments, each axis of feature hyperspace may correspond to an element of message feature vector 50. In such a hyperspace, messages sharing a common set of features may be relatively close together, forming a cluster.

In some embodiments, message clusters may be defined according to hyperspace distances between the feature vector of each message 40 and a set of representative feature vectors, e.g. cluster centroids. Distance calculator 53 may input a pair of feature vectors and return the hyperspace distance between the two vectors. Distances between numeric items may be computed as Euclidean distances or Manhattan distances, or combinations thereof, while distances between non-numeric items may be computed using e.g. the Levenshtein or Hamming metric. In an embodiment which uses tree-representations of layout feature vectors (FIG. 5-E), a distance between two trees may be defined as the edit distance between the trees, i.e. a minimum cost to transform one tree into the other using elementary operations such as substitution, insertion, and deletion. Inter-tree edit distances may be determined using e.g. a Zhang-Shasha or Klein algorithm.

Figure 6:
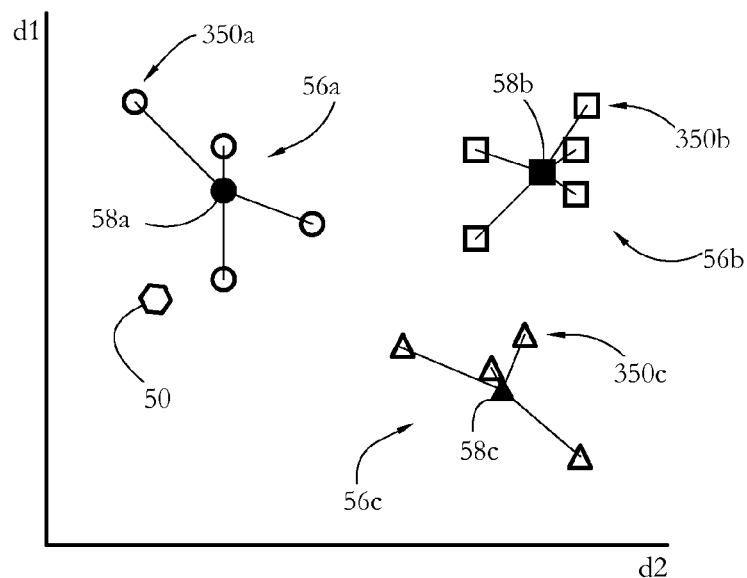
FIG. 6 shows a representation of a message and of an exemplary set of three message clusters in a 2-D feature hyperspace, according to some embodiments of the present invention.

FIG. 6 shows three exemplary message clusters 56*a-c* formed by message feature vectors 350*a-c*, respectively, in a simple 2-D feature hyperspace having two axes, d1 and d2. In a simple embodiment, axis d1 may represent message size (kB), while axis d2 may denote the number of lines. Each cluster 56*a-c* has a corresponding cluster centroid 58*a-c*, which can be used as representative vector for the respective cluster. In some embodiments, the hyperspace coordinates of centroids 58*a-c* are averages or other combinations (with or without weights) of cluster member coordinates, or combinations of averaged and actual coordinates. In some embodiments, centroids 58*a-c* may have cluster-averaged coordinates along a first set of axes, and cluster-median coordinates along a second set of axes. In some embodiments, each centroid 58*a-c* is a point in feature hyperspace characterized by the shortest total distance (smallest distance sum) to all the members of its corresponding cluster 60*a-c*. In some embodiments, centroids 58*a-c* are message feature vectors corresponding to actual spam messages.

Some embodiments of clustering engine 52 may assign incoming message 40 to the cluster whose centroid is the shortest distance away in feature hyperspace from feature vector 50 corresponding to message 40. For example, in FIG. 6, vector 50 may be assigned to message cluster 56*a*. In some embodiments, clustering in feature hyperspace may be performed using a k-means method in conjunction with a k-medoids method.

To assign message 40 to a cluster, clustering engine 52 may input cluster parameters 54 (FIG. 4). In some embodiments, cluster parameters 54 are functional variables that control the performance of engine 52. Examples of cluster parameters 54 include the position and class allocation of each cluster centroid, a set of inter-centroid distances, a set of cluster diameters, and a set of cluster ages. In some embodiments, parameters 54 may be downloaded from filter training system 12 via periodic or on-demand software updates over network 16.

Figure 7:
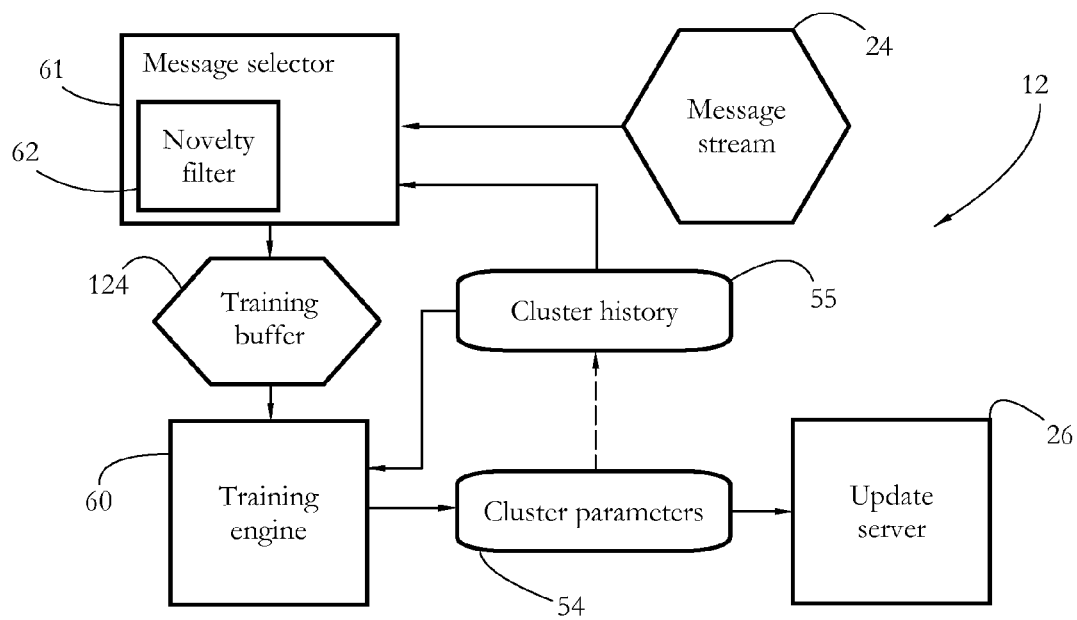
FIG. 7 shows a diagram of an exemplary filter training system of FIGS. 1-A-B according to some embodiments of the present invention.

In some embodiments, clustering filter 32 may be trained (optimized) to improve spam-detection performance by varying the values of cluster parameters 54. FIG. 7 shows an exemplary diagram of filter training system 12, 112 (FIG. 1-A-B) according to some embodiments of the present invention. System 12 receives a message stream 24, a message selector 61 configured to receive stream 24, a training engine 60 connected to message selector 61, and an update server 26 connected to training engine 60. In some embodiments, message selector 61 comprises a novelty filter 62.

System 12 may also include a cluster history 55. In some embodiments, cluster history 55 comprises a knowledgebase of spam information available to message selector 61 and training engine 60 at runtime. For example, cluster history 55 may include centroid hyperspace coordinates for all known spam clusters, the class assignment of each cluster, and a set of inter-centroid distances, cluster diameters, and cluster ages, among others. In some embodiments, cluster history 55 may also comprise a set of spam messages (and/or feature vectors) representative of each cluster.

Message stream 24 includes a collection of messages, which accumulate by the addition of incoming mail. An exemplary stream 24 is the email flow arriving at a corporate server. In some embodiments, stream 24 contains only spam messages. In some embodiments, stream 24 may include both spam and non-spam messages. Non-spam messages may be filtered out of the stream by a subsystem of filter training system 12, automatically or under human supervision. In some embodiments, parts of message stream 24 may reside on the same computer system as training engine 60 or on other computer systems and/or on computer-readable media forming part of system 12.

In some embodiments, training system 12 is configured to perform a filter training cycle, comprising assembling a training buffer 124 of messages from stream 24, feeding the contents of buffer 124 to training engine 60, computing cluster parameters 54, and outputting parameters 54 to update server 26. Such a training cycle may be performed repeatedly, either on demand or according to a message accumulation condition, as detailed below.

In some embodiments, message selector 61 is configured to identify and select a subset of spam messages from stream 24, comprising only messages that do not fit into any known category of spam, such as messages that belong to a new spam wave. The subset of stream 24 forms training buffer 124, and is forwarded on to training engine 60. In some embodiments, training buffer 124 may contain only unique spam messages (multiple copies of the same message are discarded, such as copies of the same message sent to a plurality of recipients).

Figure 8:
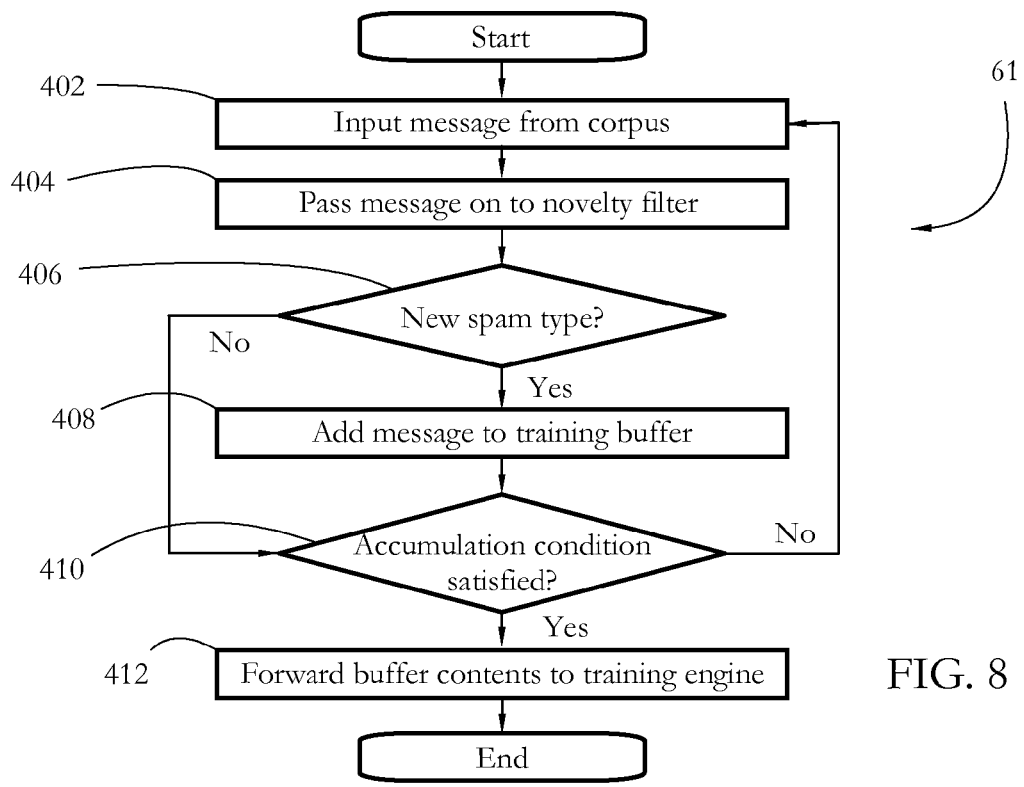
FIG. 8 shows an exemplary sequence of steps detailing the operation of the message selector of FIG. 7, according to some embodiments of the present invention.

FIG. 8 shows an exemplary sequence of steps performed by message selector 61 according to some embodiments of the present invention. In a step 402, message selector 61 inputs a message 140 from stream 24. In a step 404, message selector 61 forwards message 140 to novelty filter 62. In a step 406, selector 61 tests whether message 140 was labeled as new spam type by filter 62. If no, selector 61 proceeds to a step 410. If yes, in a step 408, message 140 is added to training buffer 124. Next, step 410 tests whether a message accumulation condition is satisfied. When the condition is satisfied, in a step 412, message selector 61 may forward the contents of buffer 124 to training engine 60 and quit. Otherwise, message selector 61 may return to step 402. In some embodiments, step 412 further comprises discarding the contents of buffer 124.

Some embodiments of message selector 61 may accumulate a buffer of messages from stream 24 and test whether a message accumulation condition is satisfied before forwarding the buffer of messages to novelty filter 62.

In some embodiments, the message accumulation condition of step 410 is quantitative. For example, buffer 124 may have a predefined size (i.e., may hold a predefined number of messages), in which case selector 61 proceeds until buffer 124 is full. In some embodiments, the message accumulation condition is temporal. Temporal accumulation may allow system 12 to operate in streaming mode. For example, message selector 61 may operate for a predetermined period of time (e.g. a period of time of less than 15 minutes, 30 minutes, or an hour), in which case training buffer 124 comprises all spam messages of a new kind detected within the respective time period.

Novelty filter 62 is configured to load message 140 from stream 24 and to determine if message 140 belongs to any known category of spam. In some embodiments, a human operator may assist the operation of novelty filter 62. In some embodiments, novelty filter 62 functions according to a data clustering algorithm, wherein message 140 is considered to belong to a spam cluster if the feature vector corresponding to message 140 lies inside the area of influence of the respective cluster, i.e. if the hyperspace distance between the feature vector of message 140 and the cluster's centroid is smaller than or equal to a cluster-specific threshold.

Figure 9:
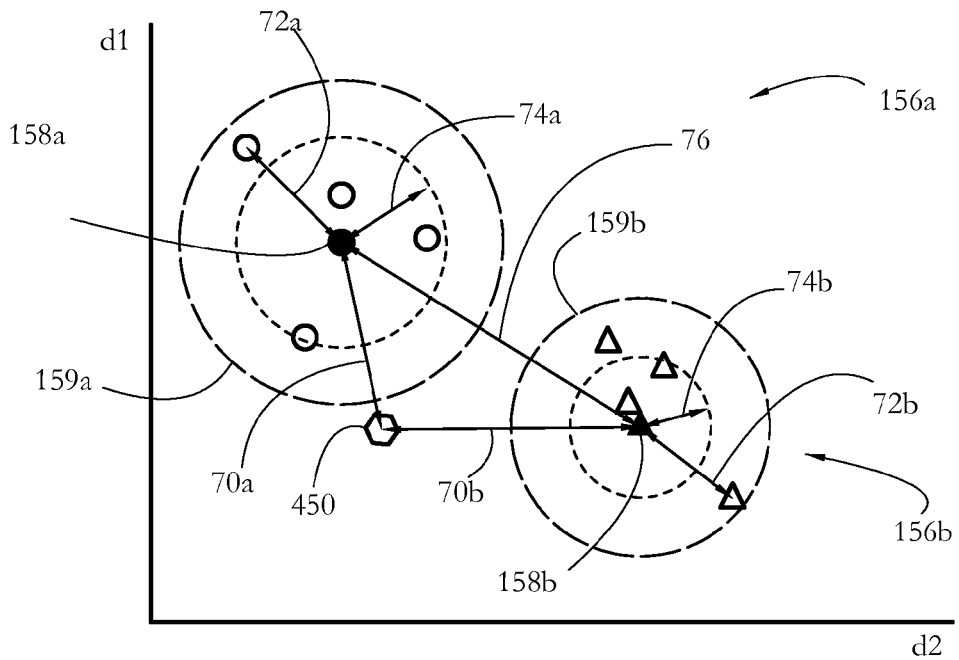
FIG. 9 shows an exemplary training message, a set of message clusters, a set of cluster centroids, a set of point-to-cluster distances, a set of inter-cluster distances, a set of cluster diameters, and a set of average cluster member distances, according to some embodiments of the present invention.

FIG. 9 illustrates two exemplary message clusters 156*a-b* (cluster members represented by circles and triangles, respectively) with respective centroids 158*a-b* and areas of influence 159*a-b*, and an exemplary feature vector 450 falling outside of both areas of influence 159*a-b*. Centroids 158*a-b* are separated by an inter-centroid distance 76. A set of point-to-centroid distances 70*a-b* separate feature vector 450 from cluster centroids 158*a-b*, respectively. Also shown are a set of cluster diameters 72*a-b* and a set of average member distances 74*a-b* corresponding to clusters 156*a-b*, respectively. In some embodiments, cluster diameters 72*a-b* are defined as the distances between the cluster centroid and the member of the respective cluster situated farthest away from the cluster centroid. Average member distances 74*a-b* may be defined as the average distance from the cluster centroid to the members of the respective cluster.

In some embodiments, the decision whether a message x falls within the area of influence of a cluster C (and therefore belongs to C) is taken according to the cluster diameter and average member distance of cluster C. For example, novelty filter 62 may test whether:

$$d_{x,C} \leq \alpha d_{max,C} + \beta d_{ave,C} + \gamma \langle d_{max} \rangle, \qquad [1]$$

wherein $d_{x,C}$ denotes the point-to centroid distance of message x, $d_{max,C}$ denotes the cluster diameter of cluster C, $d_{ave,C}$ is the average member distance of cluster C, while $\langle d_{max} \rangle$ represents the average cluster diameter of all known clusters, and $0 \leq \alpha, \beta, \gamma \leq 1$. If condition [1] is satisfied, message x belongs to cluster C. If condition [1] is not satisfied for any of the set of known spam clusters, message x is considered new spam and is added to training buffer 124. Exemplary values $\alpha=0.6$, $\beta 0.4$, $\gamma=0.2$ were used in computer experiments.

Figure 10:
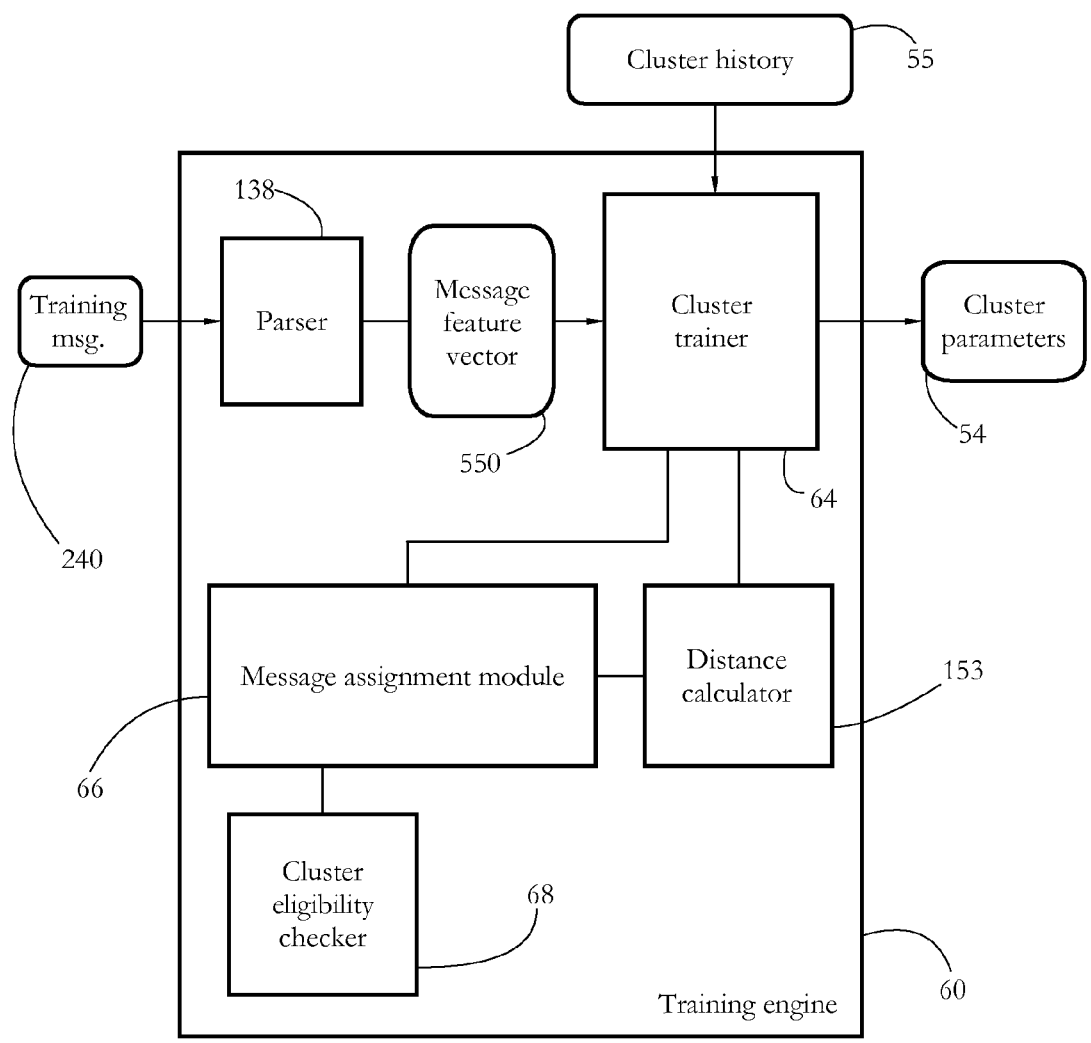
FIG. 10 illustrates the structure of an exemplary training engine forming part of the filter training system of FIG. 7, according to some embodiments of the present invention.

FIG. 10 shows a diagram of training engine 60 according to some embodiments of the present invention. Engine 60 comprises a parser 138, a cluster trainer 64 connected to parser 138, and a message assignment module 66 connected to cluster trainer 64. Engine 60 may further comprise a cluster eligibility checker 68 connected to module 66 and a distance calculator 153 connected to cluster trainer 64 and module 66. Training engine 60 is configured to receive a training message 240 from training buffer 124 and to compute cluster parameters 54 according to message 240 and cluster history 55.

Parser 138 processes each message 240 to extract a message feature vector 550 representing message 240 in the hyperspace of message features. In some embodiments, the operation of parser 138 is similar to that of parser 38 (FIG. 4). In some embodiments, training engine 60 may receive message feature vector 550 directly from novelty filter 62 or from other subsystems of training system 12, and does not contain parser 138.

Cluster trainer 64 is configured to compute a set of new cluster centroids for the training buffer messages, effectively creating a new set of clusters to accommodate the new spam types detected by novelty filter 62 within the current training cycle. In some embodiments, cluster trainer 64 may use a modified k-means algorithm to compute the coordinates of new centroids. The number of clusters maintained by trainer 64 is dynamically variable. The number of clusters may change repeatedly during the training cycle and/or from one training cycle to the next, increasing when new clusters are generated to include new spam types, and decreasing when clusters are removed according to their age or following cluster mergers. By contrast, the number of clusters in a conventional k-means algorithm is typically pre-defined and either remains constant throughout the training cycle, or may only decrease as a result of cluster mergers.

Figure 11:
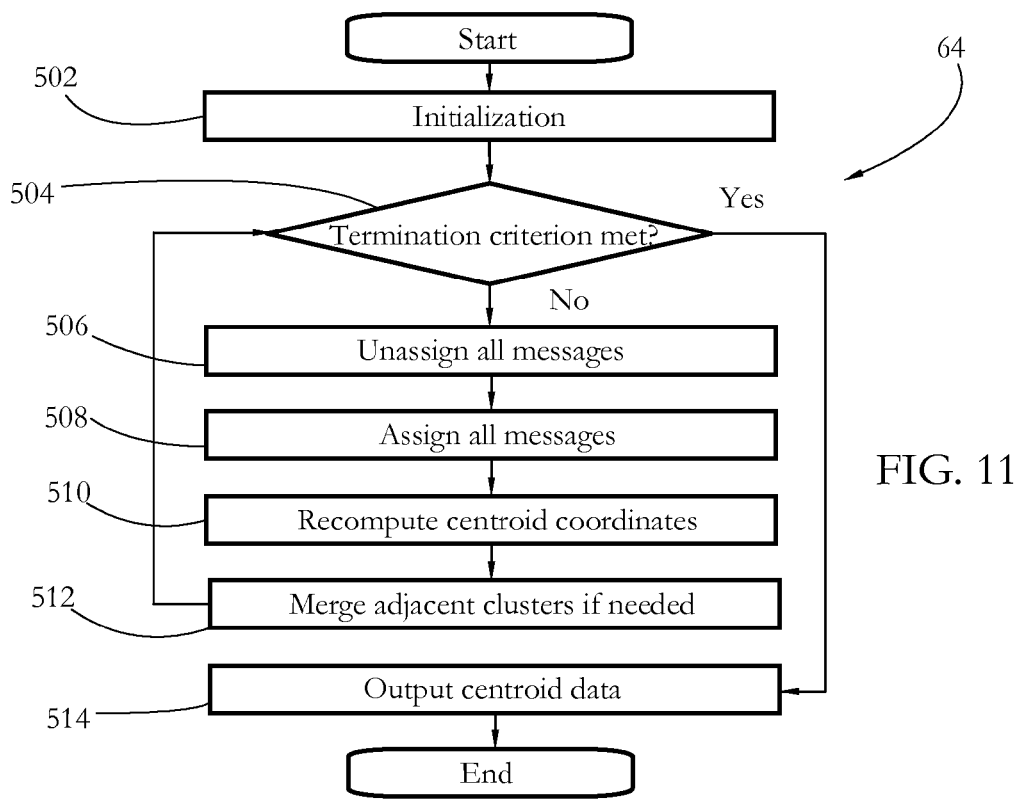
FIG. 11 shows an exemplary sequence of steps performed by the cluster trainer forming part of the training engine of FIG. 9, according to some embodiments of the present invention.

FIG. 11 shows an exemplary sequence of steps performed by cluster trainer 64 according to some embodiments of the present invention. The process performed by trainer 64 comprises an initialization step 502 described in detail below, followed by a sequence of steps 504-512 forming an iteration, which is repeated until a termination criterion is satisfied. A step 504 verifies whether the termination criterion for the training process is met, which may include e.g., having each message in training buffer 124 assigned to a cluster. An additional termination criterion may be that the set of cluster centroids has converged, i.e. if message assignment does not change between successive iterations, or if a particular cluster configuration is found more than once within a predetermined window of N message assignment iterations. If the condition for termination is met, a step 514 computes cluster parameters 54, outputs parameters 54 to training engine 60, and quits.

In some embodiments, computing cluster parameters 54 comprises merging the set of known spam data stored in cluster history 55 with the set of new centroids computed by cluster trainer 64 within the current training cycle. Step 514 may further comprise removing data corresponding to a subset of clusters from parameters 54, according to e.g. a cluster age. For example, all clusters whose age exceeds a predetermined threshold (e.g. three months) at the time of the current training cycle may be deleted. In some embodiments, the age of a cluster is a number indicating how old the respective cluster is. Cluster age may be defined according to e.g. the arrival time (timestamp) of a cluster member, or to the average arrival time of cluster members, or to the time elapsed since the latest change in the position of the centroid of the respective cluster.

Cluster parameters 54 may be saved by training system 12 as an updated cluster history to be used in the next training cycle (represented by the dashed line in FIG. 7). In some embodiments, update server 26 (FIG. 7) makes cluster parameters 54 available to message classifiers 30, 130 over network 16 (FIG. 1-A-B).

If the termination condition of step 504 is not fulfilled, in a step 506 all messages in the training buffer 124 are unassigned from their current clusters. Next, in a step 508, new assignments are computed for all messages in the training buffer 124. A step 510 calls for a re-calculation of centroid coordinates following cluster reassignments carried out in step 508. Next, in a step 512, trainer 64 checks whether any two clusters are too close together and if so, merges the adjacent clusters. Steps 502 and 508-512 are discussed in more detail below.

Figure 12:
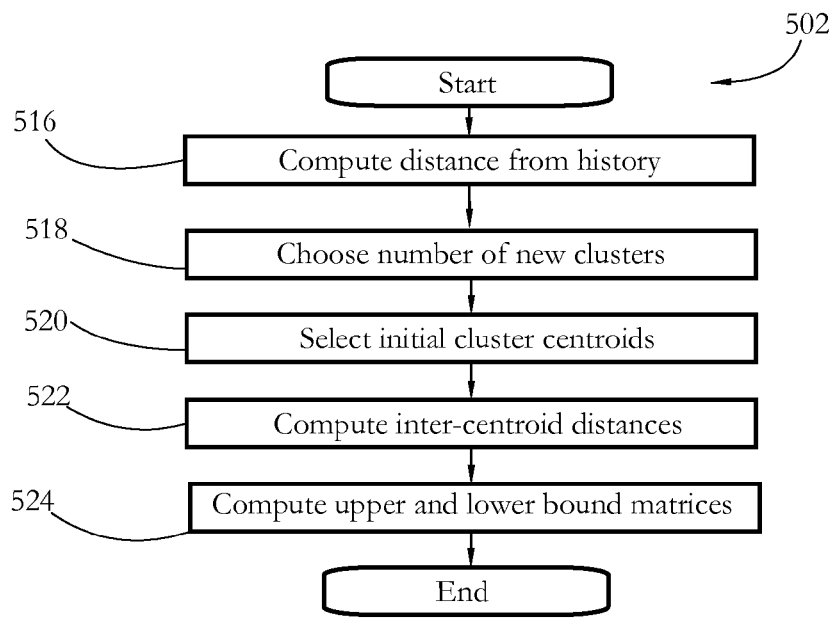
FIG. 12 shows an exemplary sequence of steps specifying the initialization procedure of the cluster trainer of FIG. 9, according to some embodiments of the present invention.

FIG. 12 illustrates an exemplary sequence of steps detailing the initialization procedure of FIG. 11 (step 502). In a step 516, trainer 64 may compute a point-to-history distance for each message in the training buffer 124. In some embodiments, the point-to-history distance of a message x is defined as:

$$d_{x,H} = \min_{C \in H} d_{x,C}, \qquad [2]$$

wherein H denotes the set of centroids corresponding to known spam clusters, and $d_{x,C}$ represents the point-to-cluster distance between message x and cluster C. In some embodiments, the point-to-history distance of a training message may act as a constraint in the process of cluster assignment, in the sense that message x may not be assigned to a new cluster C' if its distance to the new cluster C' is larger than its distance to history ($d_{x,C'} > d_{x,H}$). To compute the point-to-history distance, cluster trainer 64 may receive the coordinates of known spam cluster centroids from cluster history 55.

In a step 518, cluster trainer 64 may choose an initial number N of new clusters to be created in the current training cycle. In some embodiments, N is computed according to the number of messages in the training buffer 124. For example, trainer 64 may decide to create a new cluster for every 10 messages in buffer 124. In some embodiments, trainer 64 computes the number of new clusters N according to the number of known spam clusters stored in cluster history 55.

In a step 520, cluster trainer 64 may select N initial cluster centroids. In some embodiments, initial centroids are actual training messages selected at random from buffer 124. Some embodiments of trainer 64 may use a maximum separation heuristic to select initial cluster centroids.

In a step 522, inter-centroid distances (see FIG. 9) are computed for all pairs of initial centroids. Next, in a step 524, cluster trainer 64 may compute an upper-bound matrix U and a lower-bound matrix L. In some embodiments, the upper- and lower-bound matrices are M-by-N matrices, wherein M and N denote the number of messages in buffer 124 and the number of clusters, respectively. In some embodiments, the elements $u_{x,C}$ and $l_{x,C}$ of the upper- and lower-bound matrices, respectively, are numbers corresponding to each message-cluster pair, representing an upper and lower bound on the distance between message x and the cluster C. Upper and lower bounds are used in the message assignment process as described in more detail below. In some embodiments, step 524 initializes matrix elements $u_{x,C}$ and $l_{x,C}$ to zero.

Figure 13:
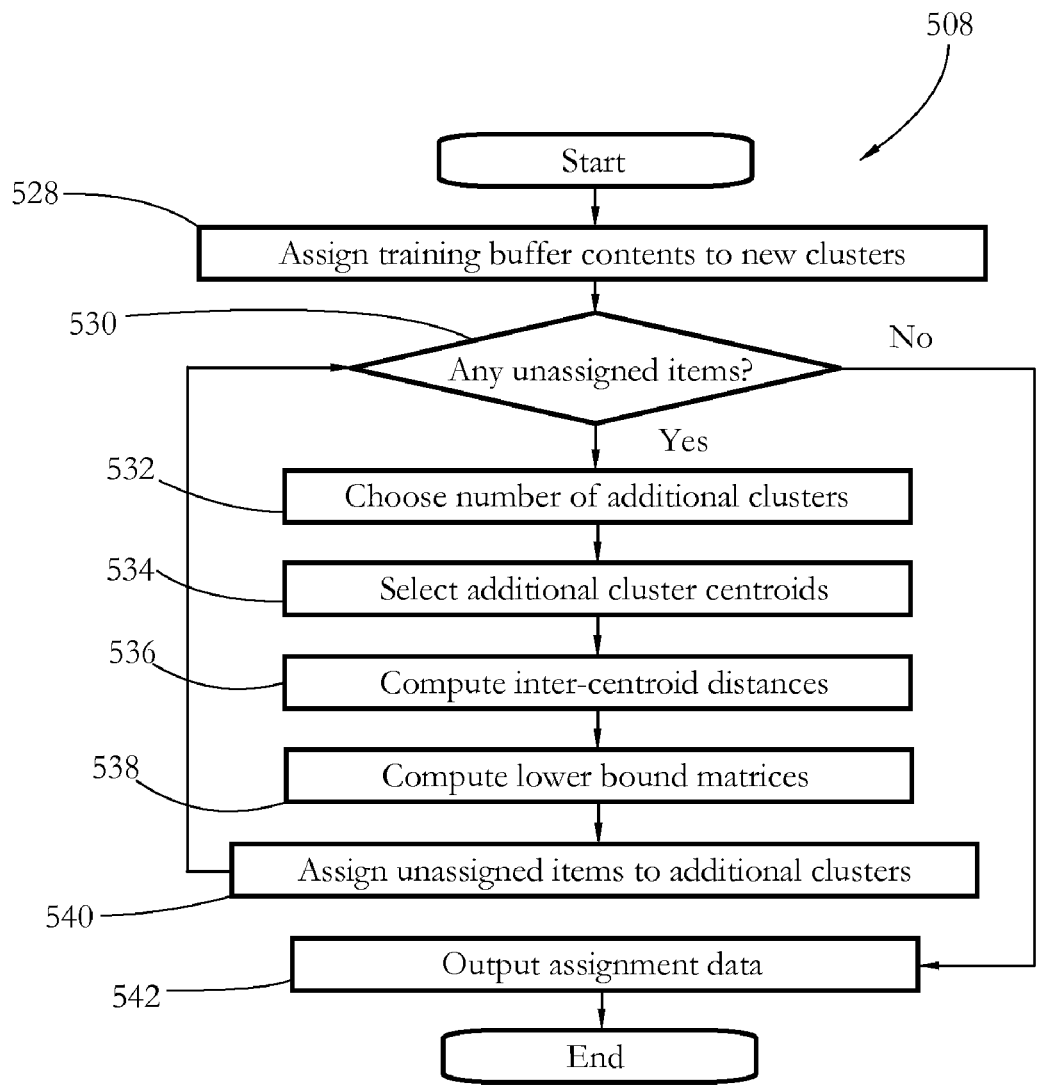
FIG. 13 shows an exemplary sequence of steps detailing the message assignment step in FIG. 10 (step 508) according to some embodiments of the present invention.

FIG. 13 shows an exemplary sequence of steps performed to implement the message assignment step in FIG. 11 (step 508). In a step 528, cluster trainer 64 invokes message assignment module 66 to perform an initial assignment of all messages in the buffer 124 to the set of clusters computed within step 502 (FIGS. 11, 12). Step 528 will be described in more detail below.

In some embodiments, process 508 further comprises a plurality of operations repeated within a loop until each training message in buffer 124 is assigned to a cluster. A step 530 verifies whether a loop termination criterion is met. If all messages in training buffer 124 are already assigned to clusters, a step 542 outputs assignment data and quits. If at least one message is not assigned to any cluster, process 508 advances to a step 532 which chooses a number N' of additional clusters to be created. In some embodiments, N' is chosen so that N'<M' and N'/N=M'/M, wherein M denotes the number of messages in training buffer 124, and wherein N and M' denote the number of clusters and number of messages unassigned at the time of execution of step 530, respectively. A step 534 selects N' centroids from the M' unassigned messages, wherein each centroid may represent one additional cluster. In some embodiments, the additional N' centroids are chosen at random, and/or following a maximum separation heuristic. Next, a step 536 may compute the inter-centroid distances (see FIG. 8) for all pairs of additional clusters. A step 538 may compute lower-bound matrix elements corresponding to every unassigned message and every additional cluster. In a step 540, cluster trainer 64 may call module 66 to assign unassigned messages to the additional clusters (see details below).

Figure 14:
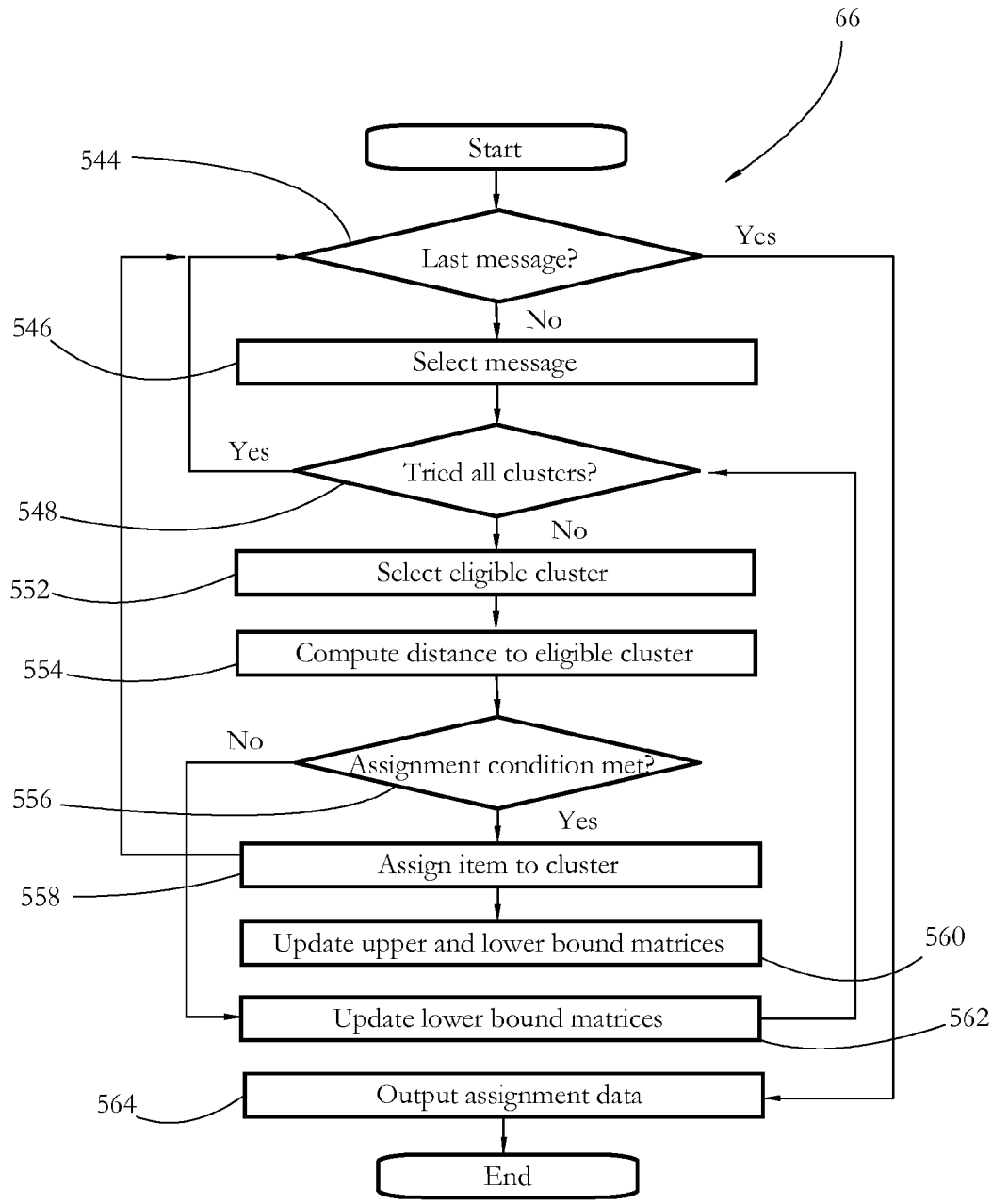
FIG. 14 shows an exemplary sequence of steps performed by the message assignment module of FIG. 9 according to some embodiments of the present invention.

FIG. 14 shows an exemplary sequence of steps detailing the operation of cluster assignment module 66 (FIG. 10). In some embodiments, module 66 receives a set of messages and a set of clusters from cluster trainer 64, and returns assignment data to trainer 64. In some embodiments, assignment data comprises a set of numbers and/or labels indicating the association of each of the set of message to one of the set of clusters. In step 528, the set of messages comprises the full training buffer 124, while the set of clusters comprises initial clusters constructed within step 502 (FIGS. 11, 12). In step 540, the set of messages comprises the set of messages left unassigned at the completion of step 528, while the set of clusters comprises additional clusters created within step 534.

In some embodiments, module 66 performs a loop of operations, repeated for every message of the respective message set. A step 544 verifies whether the last message of the message set has been analyzed. If yes, a step 564 may output assignment data to process 508 and quit. If no, a step 546 may select a message x from the message set. A step 548 verifies whether the last cluster of the set of clusters has been considered for assignment. If yes, the process returns to step 544. If no, a step 552 may invoke cluster eligibility checker 68 (FIG. 10) to select an eligible cluster from the set of clusters.

In some embodiments, cluster eligibility checker 68 selects a cluster C from the set of clusters and evaluates an eligibility condition. If the eligibility condition is satisfied, checker 68 may return the eligible cluster C to module 66. Otherwise, checker 68 may select another cluster and re-evaluate the eligibility condition, until all clusters have been considered. The eligibility condition may comprise a relationship between a pair of hyperspace distances. For in example, in some embodiments, a message may not be assigned to a cluster which is farther from the message than the point-to-history distance of the message, and therefore such a cluster may not be eligible. In some embodiments, cluster C is considered eligible for assignment of a message x if cluster C satisfies the conditions:

$$\max(u_{x,Cx}, d_{x,H}) > l_{x,C} \qquad [3]$$

and $$\max(u_{x,Cx}, d_{x,H}) > \frac{1}{2} d(C_x, C)$$

wherein $u_{x,Cx}$ is the upper bound matrix element corresponding to message x and the cluster $C_x$ to which message x is already assigned, wherein $d_{x,H}$ is the point-to-history distance of message x (Eqn. [2]), wherein $l_{x,C}$ denotes the lower bound matrix element corresponding to message x and cluster C and wherein $d(C_x, C)$ is the inter-centroid distance between clusters $C_x$ and C. In some embodiments, if message x is currently not assigned to any cluster (e.g., at the beginning of training), $C_x$ is set to null and the corresponding upper and lower bound matrix elements are set to zero.

In a step 554, distance calculator 153 evaluates the distance between message x and the centroid of eligible cluster C. Next, in a step 556 an assignment condition is evaluated. In some embodiments, step 556 comprises comparing the point-to-cluster distance $d_{x,C}$ between message x and eligible cluster C to the point-to-cluster distance $d_{x,Cx}$ between message x and the cluster to which it is currently assigned. If $d_{x,C} < d_{x,Cx}$, the process advances to step 558, otherwise to step 562.

In a step 558, message assignment module 66 effectively switches the assignment of message x from cluster $C_x$ to eligible cluster C. If message x was previously unassigned, step 558 may assign x to cluster C and remove x from the list of unassigned messages. A step 560 may update the upper and lower bound matrix elements corresponding to message x: $u_{x,C} = d_{x,C}$ and $l_{x,C} = d_{x,C}$, respectively, and subsequently return to step 548. A step 562 may update lower bound matrix elements according to the formula $l_{x,C} = \max(l_{x,C}, d_{x,C})$.

If step 508 produces any change in the assignment of at least one of the messages in the training buffer 124, step 510 (FIG. 11) may recompute the hyperspace coordinates of cluster centroids. In some embodiments, message feature vector 50 may comprise coordinates with a computable mean (e.g. numbers) and coordinates without a computable mean (e.g. lists or character strings, see e.g. FIG. 5-A). For each cluster, trainer 64 may update each centroid coordinate with a computable mean to the average of the respective coordinates of cluster members. In some embodiments, coordinates without a computable mean are updated according to a k-medoid algorithm. In some embodiments, cluster trainer 64 may be configured to select, for each cluster, a subset of p messages that are closest to the respective cluster's current centroid. Each current centroid is then replaced by the message that is closest to all other members of the respective subset of p messages. Step 510 may further comprise an update of the upper and lower bound matrix elements corresponding to cluster members:

$$u_{x,C} \rightarrow u_{x,C} + d(C,C') \text{ and } l_{x,C} \rightarrow \max[l_{x,C} - d(C,C'), 0], \qquad [4]$$

wherein d(C, C') denotes the distance between the positions of the cluster centroid before and after step 510, respectively. In some embodiments, inter-centroid distances are also updated.

In step 512 (FIG. 11), some embodiments of cluster trainer 64 may merge a subset of the clusters computed in steps 508-510. In some embodiments, if the inter-centroid distance between two clusters $C_1$ and $C_2$ is smaller than a predefined threshold t, clusters $C_1$ and $C_2$ may merge into a new cluster $C_3$. Coordinates with a computable mean corresponding to the new centroid of cluster $C_3$ be computed as weighted averages of the respective coordinates of $C_1$ and $C_2$:

$$(c_3)_i = \frac{(c_1)_i M_1 + (c_2)_i M_2}{M_1 + M_2}, \quad [5]$$

wherein $(c_j)_i$ denotes the i-th coordinate of the centroid of cluster $C_j$ (j=1, 2, 3), and wherein $M_j$ denote the number of messages currently assigned to cluster $C_j$ (j=1, 2). In some embodiments, coordinates of $c_3$ without computable means may be set equal to the coordinates of the message assigned to either $C_1$ or $C_2$, which is closest in feature hyperspace to both centroids $c_1$ and $c_2$. For example, $$(c_3)_k = (x)_k, \quad [6]$$

so that $$d_k(x, c_1) + d_k(x, c_2) = \min_{y \in C_1 \cup C_2} [d_k(y, c_1) + d_k(y, c_2)],$$

wherein $d_k(x,c_j)$ denotes the distance along the k-th hyperspace coordinate between message x and the centroid of cluster $C_j$ (j=1, 2).

In some embodiments, step 512 may further comprise removing $C_1$ and $C_2$ from the list of clusters, and subsequently updating upper and lower bound matrices for all message-cluster pairs involved. For example, $$u_{x,C} \rightarrow u_{x,C} + d(C_j, C_3) \text{ and } l_{x,C} \rightarrow \max[l_{x,C} - d(C_j, C_3), 0], \quad [7]$$

wherein j=1 or 2, depending on whether message x was assigned to cluster $C_1$ or $C_2$, respectively, before cluster merge.

The exemplary systems and methods described above allow training a message classification system to dynamically allocate a stream of incoming spam messages to a variable number of clusters (e.g. message categories) containing messages which share a set of similar features. By comparing incoming messages to a collection of known spam messages grouped into a set of existing clusters, such methods and systems may effectively identify new spam types (e.g. incoming spam waves) and automatically create a variable number of new clusters to accommodate the new spam types. The set of cluster parameters determined during training, such as the position of new cluster centroids, may be forwarded to a client system, where the parameters can be used to filter spam.

In general, an optimal number of clusters needed to capture the diversity of a set of email messages may not be known a priori. A dynamic cluster assignment process performed as described above allows maintaining an optimal number of relevant clusters in real time, by including newly discovered clusters, merging similar clusters, and/or removing older clusters considered obsolete.

The computational performance of clustering algorithms may depend significantly on the size of the corpus being analyzed. The exemplary systems and methods described above allow breaking up a large collection of messages into conveniently sized subsets of messages and dynamically creating representative clusters for each subset of messages, rather than classifying a large collection of messages such as an entire spam corpus in one training cycle. Such dynamic cluster creation may allow considerably accelerating the spam classification process. Consider for example a message corpus incorporating 10,000 spam messages classified in a number of initial spam clusters. A set of 100 newly-received spam messages may be used to create one or more new clusters which are dynamically added to the initial spam clusters as described above. The dynamic cluster addition process is then repeated periodically. Such a dynamic cluster creation approach may be substantially faster than adding the 100 newly-received spam messages to the original 10,000-message corpus to create a new 10,100-message corpus, and identifying a set of clusters for the 10,100-message corpus. A further acceleration of training is provided by considering only messages which do not fit into any known category of spam, and therefore are likely to belong to new spam waves.

Spam often evolves quickly over time; it is not uncommon to observe multiple new spam waves in one day. The speed of spam detection may be an important criterion when judging the performance of any anti-spam product. Analyzing a relatively small subset of spam messages at a time and dynamically adding new spam clusters allows the detection and characterization of new spam waves in almost real time. Fast detection of new spam waves may significantly benefit the rapid extraction of spam signatures.

New spam types may reuse older message layout templates, or use new templates altogether. In general, message layout varies little within any given spam wave, and the exemplary methods and systems described above may include layout feature indices in the feature vectors representing individual messages, allowing identification of new spam waves according to message layout. Defining a message feature vector as a combination of numerical-scalar (Euclidean) elements and list/tree/character-string elements allows implementing a diverse set of spam-identifying heuristics for message characterization.

Message similarities may be evaluated according to distances in message feature hyperspace. Such distances may include components based on Manhattan or Euclidean distances for vector components having numerical scalars, and edit distances for vector components having list/tree/character-strings. Similarly, message clusters may be defined by centroid vectors having an averaged-coordinate component for numerical values, and a representative-coordinate component for lists or strings.

The performance of message clustering methods may depend significantly on the number of hyperspace distance calculations required for classification. The exemplary methods and systems presented above may take advantage of triangle-type inequalities to accelerate distance calculations. By maintaining a set of inter-centroid distances, and a pair of upper and lower bound index matrices, and by using conditions of the type described in Eq. [3], a relatively large number of distance calculations may be avoided.

To illustrate the operation of an exemplary filter training system as described above, a simulation was conducted using the spam flow received at a corporate server. The test was conducted on a Dell® T7570 workstation with 2 GB RAM, running Windows® XP SP3. The results are summarized in Table 1 (all numbers approximate).

| Test # | Time | False Neg. | New Spam Types | Training Lasted | New Clusters | % novelty |
|---|---|---|---|---|---|---|
| 1 | 23:00-23:10 | 622 | 419 | 35 m, 7 s | 228 | 6.7 |
| 2 | 23:11-23:20 | 278 | 127 | 3 m, 6 s | 121 | 4.6 |
| 3 | 23:21-23:30 | 344 | 160 | 5 m, 52 s | 152 | 4.7 |
| 4 | 23:31-23:40 | 220 | 88 | 1 m, 23 s | 88 | 4.0 |
| 5 | 23:41-23:50 | 756 | 237 | 6 m, 7 s | 230 | 3.1 |
| 6 | 23:51-24:00 | 309 | 102 | 56 s | 101 | 3.3 |
| 7 | 00:01-00:10 | 406 | 122 | 3 m, 24 s | 122 | 3.0 |
| 8 | 00:11-00:20 | 217 | 73 | 1 m, 40 s | 73 | 3.4 |
| 9 | 00:21-00:30 | 432 | 195 | 12 m, 35 s | 193 | 4.5 |
| 10 | 00:31-00:40 | 236 | 92 | 1m, 58 | 90 | 3.9 |
| 11 | 00:41-00:50 | 127 | 51 | 52 s | 51 | 4.0 |
| 12 | 00:51-01:00 | 745 | 148 | 5 m, 1 s | 148 | 2.0 |
| 13 | 01:01-01:10 | 607 | 95 | 58 s | 95 | 1.6 |
| 14 | 01:11-01:20 | 922 | 298 | 9 m, 9 s | 271 | 3.2 |
| 15 | 01:21-01:30 | 3194 | 460 | 11 m, 40 s | 448 | 1.4 |
| 16 | 01:31-01:40 | 1736 | 192 | 2 m, 21 s | 189 | 1.1 |
| 17 | 01:41-01:50 | 2998 | 219 | 5 m, 30 s | 213 | 0.7 |
| 18 | 01:51-02:00 | 2213 | 203 | 15 m, 28 s | 202 | 0.9 |
| Total | 180 m | 16362 | 3281 | 123 m, 7 s | 3015 | 3.1 |

Incoming spam was collected in successive 10-minute intervals, for a total of three hours (column 2). Each 10-minute corpus was analyzed by an anti-spam filter, producing a number of false negatives (spam wrongly classified as legitimate messages, column 3), with an overall spam detection rate of approximately 90%. The approximate number of messages in each time interval may be estimated by multiplying by 10 the false negative number of column 3 Out of each batch of false negatives, an exemplary novelty filter (FIG. 7) identified a subset of unique new spam types (column 4). An exemplary training engine (FIG. 10) was used to compute a new set of clusters corresponding to each subset of new spam types. The training time and number of new clusters are given in columns 5 and 6, respectively. The percentage of new spam detected by the novelty filter as a fraction of the total spam flow is shown in column 7. The fact that the training time was typically a fraction of the total time proves the capability of these exemplary embodiments to analyze a large flow of spam in real time, i.e., in a streaming configuration.

It will be clear to one skilled in the art that the above embodiments may be altered in many ways without departing from the scope of the invention. Accordingly, the scope of the invention should be determined by the following claims and their legal equivalents.

What is claimed is:

1. A method comprising employing a computer system to perform the steps of:
   receiving a message stream;
   determining whether to add a new cluster to a set of spam clusters by determining whether a first message of the message stream belongs to at least one cluster of the set of spam clusters according to a feature space distance between the first message and a centroid of the at least one cluster;
   when the first message does not belong to any cluster of the set of spam clusters, adding the new cluster to the set of spam clusters, wherein the new cluster includes the first message;
   performing a comparison between a first quantity and a second quantity, wherein the first quantity is an indicator of a distance separating the first message from a centroid of a first cluster of the set of spam clusters, and wherein the second quantity is $d(C_1, C_2)/2$, wherein $d(C_1, C_2)$ is a distance separating the centroid of the first cluster from a centroid of a second cluster of the set of spam clusters; and
   deciding according to a result of the comparison whether to compute a distance separating the first message from the second centroid.

2. The method of claim 1, further comprising:
   determining whether a message accumulation condition for the message stream is satisfied;
   performing said determining whether to add the new cluster to the set of spam clusters selectively when the message accumulation condition is satisfied.

3. The method of claim 2, wherein the message accumulation condition comprises determining whether an accumulated message count exceeds a predetermined threshold.

4. The method of claim 2, wherein the message accumulation condition comprises determining whether an accumulated message time period exceeds a predetermined threshold.

5. The method of claim 1, wherein determining whether the first message belongs to the at least one cluster further comprises comparing the feature space distance to a threshold.

6. The method of claim 1, wherein a feature vector representing the first message comprises a set of layout feature indices characterizing a set of relative positions of a plurality of metaword substructures of the first message.

7. The method of claim 6, wherein the layout feature indices include a message summary string.

8. The method of claim 1, further comprising:
   selecting a third cluster from the set of spam clusters according to an age of a message belonging to the third cluster; and
   removing the third cluster from the set of spam clusters.

9. The method of claim 1, wherein the first message comprises an electronic mail message.

10. The method of claim 1, wherein the first quantity is a function of a point-to-history distance of the first message.

11. A computer system comprising at least one processor programmed to form:
   a novelty filter configured to determine whether to add a new cluster to a set of spam clusters by determining whether a first message of a message stream belongs to at least one cluster of the set of spam clusters according to a feature space distance between the first message and a centroid of the at least one cluster;
   a training engine connected to the novelty filter and configured to add the new cluster to the set of spam clusters when the first message does not belong to any cluster of the set of spam clusters, wherein the new cluster includes the first message, and further configured to:
      perform a comparison between a first quantity and a second quantity, wherein the first quantity is an indicator of a distance separating the first message from a centroid of a first cluster of the set of spam clusters, and wherein the second quantity is $d(C_1, C_2)/2$, wherein $d(C_1, C_2)$ is a distance separating the centroid of the first cluster from a centroid of a second cluster of the set of spam clusters, and
      decide according to a result of the comparison whether to compute a distance separating the first message from the second centroid.

12. The system of claim 11, further comprising: a training buffer connected to the training engine and configured to accumulate messages of the message stream, and to make available the first message to the training engine selectively when a message accumulation condition is satisfied.

13. The system of claim 12, wherein the message accumulation condition comprises determining whether an accumulated message count exceeds a predetermined threshold.

14. The system of claim 12, wherein the message accumulation condition comprises determining whether an accumulated message time period exceeds a predetermined threshold.

15. The system of claim 11, wherein the novelty filter is configured to determine whether the first message belongs to the second cluster according to a comparison between the feature space distance and a threshold.

16. The system of claim 11, wherein a feature vector representing the first message comprises a set of layout feature indices characterizing a set of relative positions of a plurality of metaword substructures of the first message.

17. The system of claim 16, wherein the layout feature indices include a message summary string.

18. The system of claim 11, wherein the training engine is further configured to select a third cluster from the set of spam clusters according to an age of a message belonging to the third cluster, and to remove the third cluster from the set of spam clusters.

19. The system of claim 11, wherein the first message comprises an electronic mail message.

20. The system of claim 11, wherein the first quantity is a function of a point-to-history distance of the first message.

21. A computer system comprising:
   means for determining whether a first message of a message stream belongs to at least one cluster of a set of spam clusters according to a feature space distance between the first message and a centroid of the at least one cluster;
   means for adding a new cluster to the set of spam clusters according to the first message when the first message does not belong to any of the set of spam clusters;
   means for performing a comparison between a first quantity and a second quantity, wherein the first quantity is an indicator of a distance separating the first message from a centroid of a first cluster of the set of spam clusters, and wherein the second quantity is $d(C_1, C_2)/2$, wherein $d(C_1, C_2)$ is a distance separating the centroid of the first cluster from a centroid of a second cluster of the set of spam clusters; and
   means for deciding according to a result of the comparison whether to compute a distance separating the first message from the second centroid.

22. The method of claim 1, further comprising performing a cluster reassignment of the first message according to the decision whether to compute the distance separating the first message from the second centroid.

23. The system of claim 11, wherein the training engine is configured to perform a cluster reassignment of the first message according to the decision whether to compute the distance separating the first message from the second centroid.

24. The system of claim 21, further comprising means for performing a cluster reassignment of the first message according to the decision whether to compute the distance separating the first message from the second centroid.

25. A non-transitory computer-readable medium encoding instructions which, when executed by a computer system, cause the computer system to:
   determine whether to add a new cluster to a set of spam clusters by determining whether a first message of a message stream belongs to at least one cluster of the set of spam clusters according to a feature space distance between the first message and a centroid of the at least one cluster;
   when the first message does not belong to any cluster of the set of spam clusters, add the new cluster to the set of spam clusters, wherein the new cluster includes the first message;
   perform a comparison between a first quantity and a second quantity, wherein the first quantity is an indicator of a distance separating the first message from a centroid of a first cluster of the set of spam clusters, and wherein the second quantity is $d(C_1, C_2)/2$, wherein $d(C_1, C_2)$ is a distance separating the centroid of the first cluster from a centroid of a second cluster of the set of spam clusters; and
   decide according to a result of the comparison whether to compute a distance separating the first message from the second centroid.

26. The computer-readable medium of claim 25, wherein the instructions further cause the computer system to perform a cluster reassignment of the first message according to the decision whether to compute the distance separating the first message from the second centroid.

\* \* \* \* \*